United States Patent
Kohli et al.

(10) Patent No.: US 9,619,605 B1
(45) Date of Patent: Apr. 11, 2017

(54) SYSTEM AND METHOD FOR AUTOMATICALLY ENFORCING SCHEMATIC LAYOUT STRATEGY SELECTIVELY APPLIED TO SCHEMATIC OBJECTS

(71) Applicant: CADENCE DESIGN SYSTEMS, INC., San Jose, CA (US)

(72) Inventors: Vikas Kohli, Noida (IN); Amit Kumar Sharma, Greater Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 419 days.

(21) Appl. No.: 13/949,549

(22) Filed: Jul. 24, 2013

(51) Int. Cl.
*G06F 15/04* (2006.01)
*G06F 17/50* (2006.01)

(52) U.S. Cl.
CPC ................. *G06F 17/5072* (2013.01)

(58) Field of Classification Search
USPC ........................................ 716/139
See application file for complete search history.

(56) References Cited

U.S. PATENT DOCUMENTS

| 2004/0225986 A1* | 11/2004 | Lin ............... G06F 17/5068 716/122 |
| 2007/0130553 A1* | 6/2007 | Wang et al. ............... 716/11 |

* cited by examiner

*Primary Examiner* — Eric Lee
(74) *Attorney, Agent, or Firm* — Rosenberg, Klein & Lee

(57) ABSTRACT

A method and system are provided for automatically enforcing a schematic layout strategy applied to a group of schematically represented circuit objects of an electronic circuit design. A circuit editing tool electronically renders schematic representations of circuit objects responsive to user input. A layout object acquisition unit coupled to the circuit editing tool actuates responsive to user input to selectively apply a predetermined layout strategy to at least one group of circuit objects for generating a corresponding layout object. The predetermined layout strategy includes a defining set of placement and interconnection routing schemes for the grouped circuit objects, one relative to the other. A layout object management unit coupled to the layout object acquisition unit and circuit editing tool adaptively reconfigures the layout object in accordance with the layout strategy thereof responsive to an editing operation being imposed on at least one circuit object within the layout object.

17 Claims, 17 Drawing Sheets

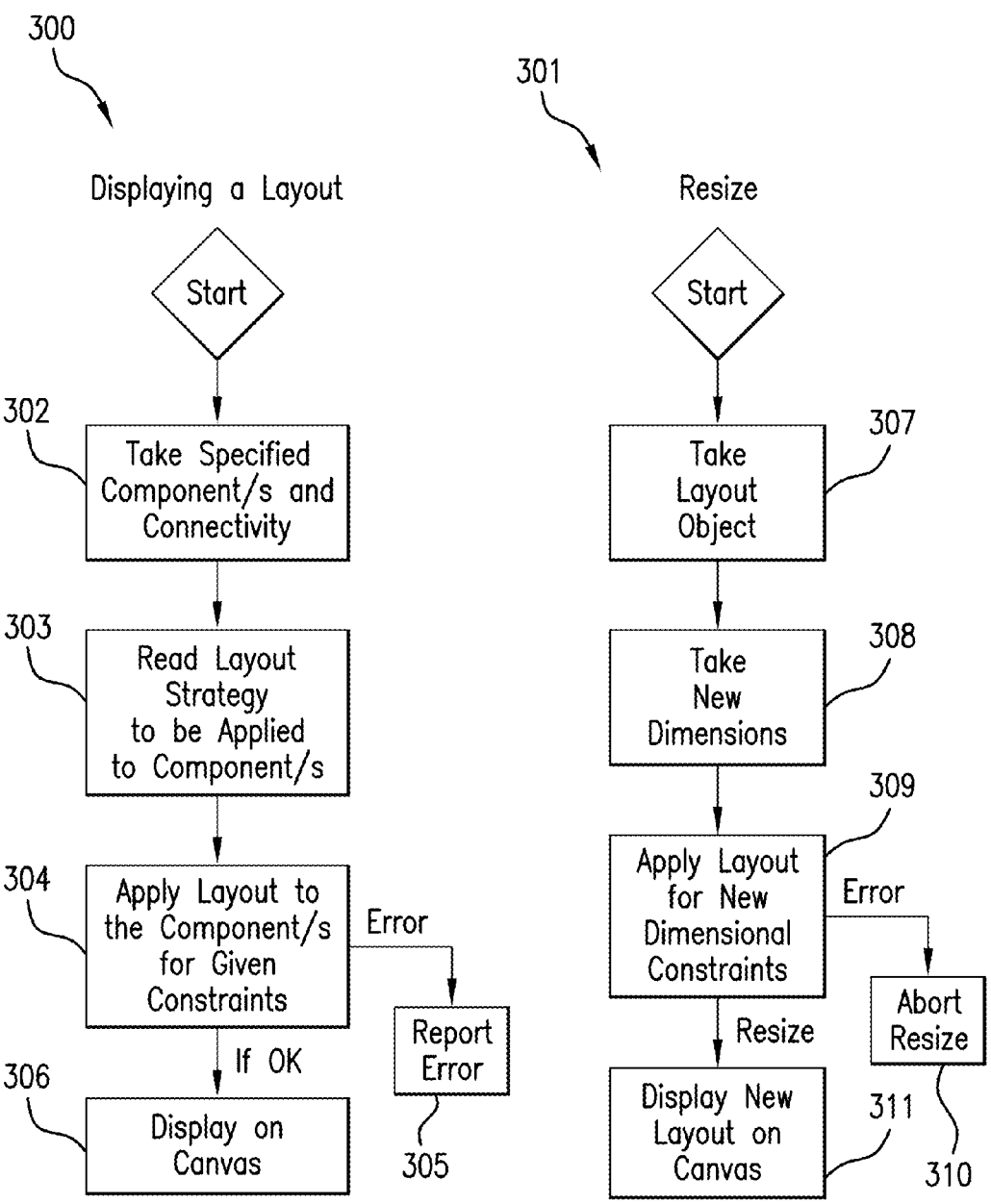

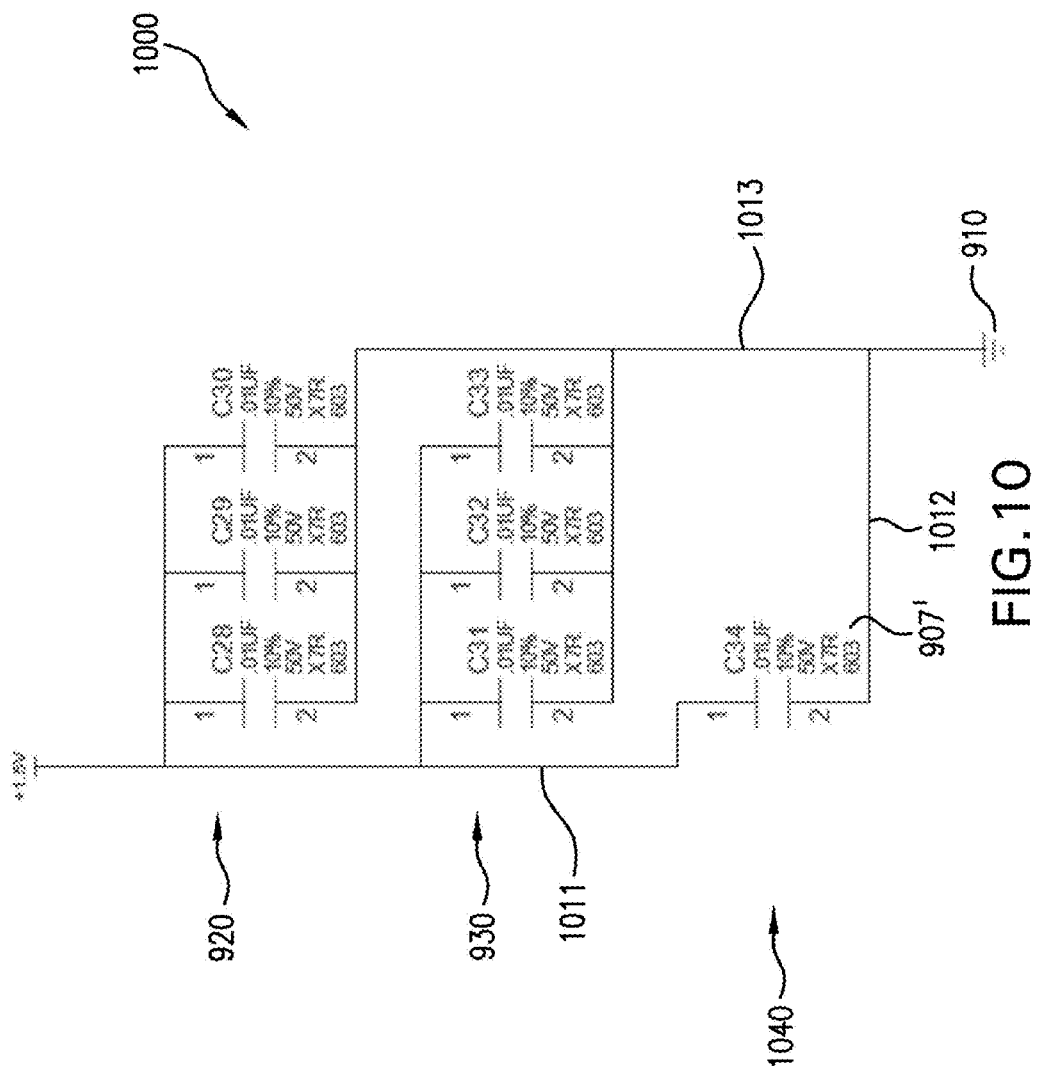

SYSTEM AND METHOD FOR AUTOMATICALLY ENFORCING SCHEMATIC LAYOUT STRATEGY SELECTIVELY APPLIED TO SCHEMATIC OBJECTS

BACKGROUND OF THE INVENTION

The subject system and method are generally directed to automatically enforcing a schematic layout strategy selectively applied to one or more groups of schematically represented circuit objects of an electronic circuit design. More specifically, the system and method thereby define a layout object for each such grouping of circuit objects. When a layout object is then subjected to editing, its constituent circuit objects are adaptively updated in schematic representation according to the layout strategy thereof.

While design tools in general and particularly electronic design automation (EDA) tools for creating, modifying, and reviewing integrated circuits (IC), printed circuit boards (PCB), and package designs to arrive at an electronic product are known, such tools heretofore known are encumbered by numerous deficiencies, not the least of which is a lack of effective usability. Graphical saturation, over-cluttering, congestion, and the inability to effectively create, manipulate, and review circuit objects collectively, all detract from the usability of such heretofore known tools.

Such deficiencies have heretofore hindered electronic data automation flows, time-to-market, and costs. There is therefore a need for a system and method for automatically enforcing schematic layout strategy selectively applied to schematic objects.

SUMMARY OF THE INVENTION

It is an object of the present invention to provide a system and method for automatically enforcing schematic layout strategy selectively applied to schematic objects.

It is an object of the present invention to provide a system and method for collective manipulation of circuit objects in a layout object.

It is an object of the present invention to provide a system and method for creation, manipulation, and ready review of layout objects.

These and other objects are attained in a method and system for automatically enforcing schematic layout strategy selectively applied to schematic objects.

A system for automatically enforcing a layout strategy applied to a group of schematically represented circuit objects of an electronic circuit design includes: a circuit editing tool accessing a graphic database to electronically render schematic representations of the circuit objects responsive to user input. The circuit editing tool has a graphic user interface and a display coupled thereto for graphically displaying the schematic representations on one or more graphic pages. A layout object acquisition unit is coupled to the circuit editing tool. The layout object acquisition unit is actuated responsive to user input to selectively apply a predetermined layout strategy to at least one group of circuit objects for generating a corresponding layout object. The predetermined layout strategy includes a defining set of placement and interconnection routing schemes for the schematic representation of the grouped circuit objects, one relative to the other. A layout object management unit is coupled to the layout object acquisition unit and the circuit editing tool. The layout object management unit adaptively reconfigures the layout object in accordance with the layout strategy thereof responsive to an editing operation being imposed on at least one circuit object within the layout object.

A system for automatically enforcing a schematic layout strategy applied to a group of schematically represented circuit objects of an electronic circuit design includes: a circuit editing tool accessing a graphic database to electronically render schematic representations of the circuit objects responsive to user input. The circuit editing tool has a graphic user interface and a display for graphically displaying the schematic representations on one or more graphic pages. A layout object acquisition unit is coupled to the circuit editing tool. The layout object acquisition unit is actuated responsive to user input to selectively apply a predetermined layout strategy to at least one group of circuit objects for generating a corresponding layout object. The predetermined layout strategy includes a defining set of placement and interconnection routing schemes for the schematic representation of the grouped circuit objects, one relative to the other. A layout object management unit is coupled to the layout object acquisition unit and the circuit editing tool. The layout object management unit is programmably configured to automatically detect an editing operation imposed by the circuit editing tool on at least one circuit object within the layout object; and, adaptively adjust the layout object responsive to editing operation detected, in accordance with the layout strategy.

A method for automatically enforcing a schematic layout strategy applied to a group of schematically represented circuit objects of an electronic circuit design includes: executing a circuit editing tool to access a graphic database and electronically render schematic representations of the circuit objects responsive to user input. The schematic representations are graphically displayed on one or more graphic pages within a graphic user interface on a display. Responsive to user input, executing a processor to selectively apply a predetermined layout strategy to at least one group of circuit objects for generating a corresponding layout object. The predetermined layout strategy includes a defining set of placement and interconnection routing schemes for the schematic representation of the grouped circuit objects, one relative to the other. A processor is executed responsive to an editing operation being imposed on at least one circuit object within the layout object to adaptively reconfigure the layout object in accordance with the layout strategy thereof.

Additional aspects and details will be set forth in the description which follows and, in part, will be apparent from the description and figures.

BRIEF DESCRIPTION OF THE DRAWINGS

FIG. 3A is a flow diagram illustrating a flow of processes for applying a predetermined layout strategy to at least one group of circuit objects carried out in accordance with an exemplary embodiment of the present invention;

FIG. 3B is a flow diagram illustrating a flow of processes in a layout object reconfiguration carried out in accordance with an exemplary embodiment of the present invention;

FIG. 10 is an illustrative representation of the reconfigured layout object illustrated in FIG. 9, as displayed in a portion of a graphic user interface generated during computer execution in accordance with an exemplary embodiment of the present invention;

DESCRIPTION OF THE PREFERRED EMBODIMENTS

Figure 1:
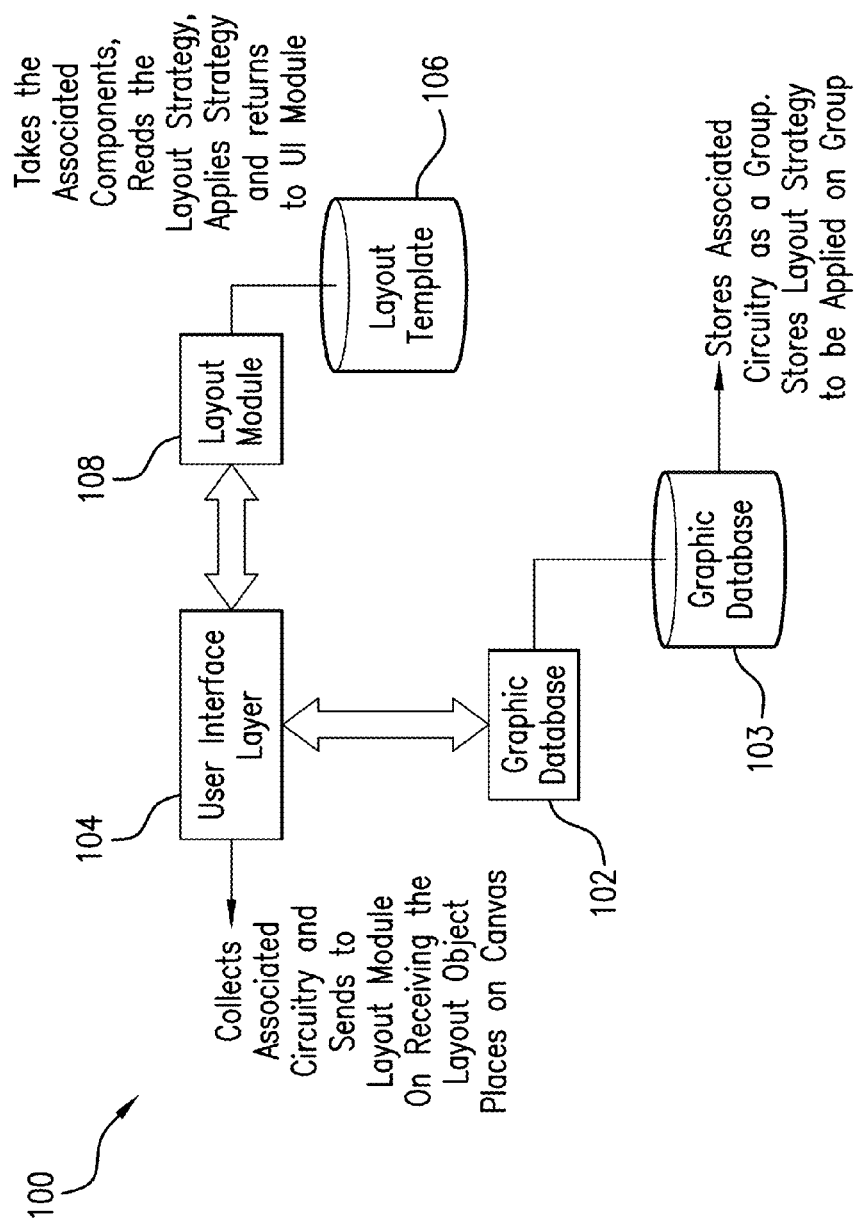
FIG. 1 is a schematic diagram illustrating an interconnection of units in an system formed in accordance with an exemplary embodiment of the present invention.

The subject system and method generally provide measures for automatically enforcing schematic layout strategy selectively applied to schematic objects. In particular, the subject system and method provide measures for creating layout objects according to predefined layout strategies to configure a group of circuit objects. A designer may thereby quickly recognize the type of circuit the layout object represents during review. The designer is further enabled to manipulate the layout object within the circuit schematic to thereby collectively manipulate the constituent group of circuit objects.

For a given circuit IC design, a large number of components are generally interconnected to form the circuit design. A circuit design may include tens to hundreds of millions of logical components and associated circuitry. PCB and package designs alone, generally have components numbered in the tens of thousands and on the order of fifty thousand connections—each potentially having corresponding associated circuitry. Such components may be stretched across numerous pages of a circuit schematic having graphical representations of each component along with interconnective conductive segments therebetween. Often, associated circuitry, such as a bypass capacitor rail, has a collection of predetermined components, such as a bank of capacitors, interconnects, a power rail, and a ground rail. However, to reconfigure the circuitry, each of the components must be individually created/instantiated (used interchangeably herein for brevity and clarity), arranged, and interconnected. A change in one component may require re-arranging and reconnecting of all the other components in the collection.

In other situations, all or a portion of the components may need to be shifted to another location, with their relative placement needing adaptive update according to changing constraints or new dimensionality requirements. On the other hand, the collection of components may need to be moved or resized without changing their relative placement or interconnectivity. But, such moving and resizing generally require individual selection and manipulation of each individual component and the interconnections between each to preserve the original circuitry layout. For example, n components may require modification, and consequently, at least 2n connections (though this may be much higher) may require adjustment. If, for an example, an entire collection of 100 components are to be moved right 2 units, then 100 movements must be made and at least 200 interconnections must be carefully recreated ensuring compliance with all manner of constraints and design rules (to the extent applicable in a logical schematic). Such individualized manipulations become increasingly labor-intensive with increasing numbers of components. When the components are arranged, such as, in a bypass rail, having closely disposed rows and columns of components, and this is to be rearranged, each individual component and interconnection requires selection and manipulation all while manually ensuring compliance with spacing requirements. To ensure readability of the design, the user must manually align the pins of the interconnected components. While grouping sought to address a portion of these problems, a number of deficiencies remain.

For teams of circuit designers to make effective use of their time, being able to collectively manipulate related components of the design would be beneficial. Additionally, being able to quickly apply a uniform arrangement to a collection of components would also be beneficial. Being able to quickly ascertain the identity and function of a collection of components in a circuit and discern important parameters, attributes, features, or the state of the design would also be particularly beneficial. However, the conventional tools of electronic design automation do not suitably provide such features.

The lack of effective, efficient, and easy-to-use interfaces in the electronic design flow inhibits designers and engineers from creating, reviewing, and manipulating circuit designs in a timely and error-free manner. A given design-house may have many design engineers all concurrently working on the same circuit design. Groups of up to ten engineers solely devoted to schematic capture of the circuit design are not uncommon. In the aggregate, any savings in time, efficiency, or reduction in errors introduced to the design by circuit engineers may be substantial. Additionally, any degree of savings in design engineers' time from dealing with associated circuitry, allows them greater focus on the core logic components.

In some design houses, engineers may be working on a logic core of the design while others work on associated/supportive portions. One team of engineers, for example, may be reviewing and modifying a portion of the logic circuitry, while a separate team of engineers seeks to modify associated circuitry responsive to changing requirements for such logic circuitry. Empowering the logic-core team of engineers to specialize and focus in the logic components and also to automatically generate associated/supportive circuitry without assistance from another team will prove beneficial. Applying a consistent strategy to collections of associated circuitry objects and facilitating their ready collective manipulation has the potential to save time, expense, reduce errors, and lead to a more cohesive design. Such a design is inherently more readable and has uniformly applied best-practices for the various collections of associated components.

A circuit editing tool electronically renders schematic representations of circuit objects responsive to user input. A layout object acquisition unit coupled to the circuit editing tool actuates responsive to user input to selectively apply a predetermined layout strategy to at least one group of circuit objects for generating a corresponding layout object. The predetermined layout strategy includes a defining set of placement and interconnection routing schemes for the grouped circuit objects, one relative to the other. A layout object management unit coupled to the layout object acquisition unit and circuit editing tool adaptively reconfigures the layout object in accordance with the layout strategy thereof responsive to an editing operation being imposed on at least one circuit object within the layout object.

An exemplary system 100 for automatically enforcing schematic layout strategy selectively applied to schematic objects is illustratively shown in FIG. 1. The system 100 employs a graphic database 103 which stores graphical representations of circuit objects along with circuit object attributes and interconnectivity information therebetween, preferably in a netlist and a connectivity database respectively. Some circuit objects may have other circuit objects associated therewith. The graphic database additionally stores, amongst other things, the associated circuitry, such as layout objects and their constituent circuit objects, related to other particular circuit objects.

A plurality of predefined layout strategies for the layout objects are preferably defined by suitable data also stored within the graphic database 103. The predefined layout strategies may be maintained in the graphic database 103, or may be stored separately. Any suitable storage format or measure may be employed. Each predefined layout strategy may have a number of expected circuit objects, placement and interconnection schemes, and attributes specified in advance.

The layout strategy preferably establishes specific types of circuit objects as members of the layout object which will be instantiated and ordered upon the enforcement of the layout strategy. The circuit objects may be preexisting in the circuit schematic and added to a layout object or may, alternatively, be instantiated with the layout object. Attributes of the layout object and the circuit objects may be specified in the layout strategy such as, for example, the placement and interconnect schemes including spacing within the layout object along with other such attributes. Layout boundary margins, spacing between circuit objects, row and column banks, interconnect schemes, and various other layout attributes may be predefined within the layout strategy and stored in the graphic database 103. The placement of each component relative to other components may be predefined as well. Any relevant attribute or characteristic bearing on the layout object, circuit objects, interconnectivity, design rules, constraints, associations, or the like may be defined and maintained within each layout strategy.

For example, the placement scheme of the layout strategy may define power pin symbols to be generally placed in the upper left hand corner of a layout object, disposed a certain distance from a capacitor bank, with a certain margin from the layout object border maintained. Similarly, ground lead symbols may be specified to be in the lower right hand corner of a layout object created in accordance with the predefined layout strategy. According to overall layout object dimensional constraints relative to dimensions of the predefined member circuit objects, predefined numbers of rows and columns of the circuit objects with predetermined interconnectivity may also be established and guaranteed to be compliant with various schematic constraints. Any such attributes of the layout strategy to be applied to a layout object, such as member placement, membership, identity, type, constraints, connectivity, visibility, page location, highlighting, and the like, may all be stored as tags/markers/fields in netlist data, graphic database, or any other suitable measure for storing attributes and data objects.

One example of numerous suitable layout strategies that may be employed in the application is illustrated below:

<LayoutStrategies version="1.0">
<!--define a ByPass layout that with one power symbol on top left and one ground on the bottom right. Multiple capacitors may be arranged in rows and coloums within the extents defined by power and ground.-->
-<LayoutStrategy class="ByPass">
<!--default margin-->
<property name="margin">5</property>
<!--default spacing-->
<property name="spacing">10</property>
<!--define the position of the elements of the ByPass rail-->
-<grid> <property name="rows">any</property> <property name="colums">any</property>
<!--there should be at least one power, ground and a capacitor. Thus the count of minimum 3-->
<property name="element count" minimum="3">any</property>-<cell index="first">

```
<!--define that one and only power symbol is there on top
left of the grid.>
  <location>"top left"</location> <power minimum="1"
maximum="1"></power> </cell>-<cell index="last">
  <!--define that one and only ground symbol is there on
bottom right.-->
  <location>"bottom right"</location> <ground mini-
mum="1" maximum="1"> </ground> </cell>
  <!--for all indices other than first and last there can be a
capacitor-->
  -<cell index="any">
  <!--there will not be any capacitor in the power and
ground row-->
  -<location> <row minimum="2" maximum="second
last"/> <column minimum="1" maximum="last"/> </loca-
tion> <capacitor> </capacitor> </cell></grid></Layout-
Strategy>
  <!--define a layout strategy where all elements can be
arranged only vertically-->
  -<LayoutStrategy class="Vertical">
  <!--default margin-->
  <property name="margin">5</property>
  <!--default spacing-->
  <property name="spacing">10</property>-<grid>
<property name="rows" maximum="1">1</property>
<property name="colums">any</property> </grid> </Lay-
outStrategy>
  <!--define a layout strategy where all elements are
arranged horizontally-->
  -<LayoutStrategy class="Horizontal">
  <!--default margin-->
  <property name="margin">5</property>
  <!--default spacing-->
  <property name="spacing">10</property>-<grid>
<property name="rows">any</property> <property
name="columns" maximum="1">1</property> </grid>
</LayoutStrategy> </LayoutStrategies>.
```

The above exemplary predefined layout strategy establishes a grid for a bypass capacitor with power, ground, and at least one capacitor. A layout object may be serialized to any suitable graphic database. The nested layout objects may be saved and/or serialized as seen in the exemplary layout strategy.

A user interface layer 104 interfaces with the graphic database unit 102. The graphic database interface unit 102 provides access to the circuit schematic, associated circuitry, layout strategies, placement and interconnect schemes, layout objects, constraints, netlist data, and the graphic representations of the circuit objects and layout objects which are predefined within graphic database 103. User interface layer 104 may also include a command window for textual Tool Command Language (Tcl/Tk) commands and output therefrom. Graphic database 103 may be maintained as one logical database, a plurality of separate constituent databases, distributed in a cloud-based system, or may include a number of files separately maintaining different types of attributes and entities of the circuit schematic. Any suitable format for the database or files may be employed.

A user may interact with the user interface layer 104 to, among other circuit schematic tasks, specify associated circuit objects, associations, and to interface with layout module 108 for creating and manipulating layout objects as well as creating and modifying layout strategies. Upon receiving a layout object from layout module 108, the user interface layer 104 places the layout object on a page of the circuit schematic displayed within the user interface layer 104. The user interface layer 104 illustratively generates a graphical user interface(s) establishing a canvas which may extend across a number of graphic pages for display of the circuit schematic defined by circuit objects, layout objects, and interconnections.

The user may employ the user interface layer 104 through any measures generally known in the art, such as a mouse, a keyboard, a touch screen, text input, a human input device (HID), or the like. The user interface layer 104 may employ any suitable number of sub-windows, canvasses, tools, user operable controls, and the like. The layout module 108 is coupled with the user interface layer 104 to provide access between the graphic database 103 and the user. The layout module 108 accepts specified circuit objects, reads the layout strategy, and applies the strategy to the selected circuit objects, to reconfigure them in accordance with the predefined layout strategy stored within graphic database 103. The layout module 108 returns a layout object, attributes thereof, and status indicia to the user interface layer module 104.

Layout module 108 may be provided with its own layout template database 106. Alternatively, the layout module 108 may access the graphic database 103, or any other suitable file-set, database, or data-store available. In the exemplary embodiment shown, the layout module 108 uses a separate layout template database 106 for storage of layout strategy files such as .xml files or the like. Upon completion of a layout object, it may be stored in the layout object template database 106, the graphic database 103, an extrinsic file, in the netlist, in the schematic database itself, or any other suitable storage/memory location providing for recall at an acceptable rate.

Layout module 108 may be executed to apply a layout strategy to a schematic of already-placed circuit objects. In such manner, the layout module 108 is passed a selection of pre-established circuit objects existing in the schematic (such as by references thereto via pointers or memory locations). The layout module 108 executes to reconfigure the selected circuit objects according to a selected predefined layout strategy. Layout module 108 may additionally capture circuit objects and auto-place the layout object in the circuit schematic. Thereby, a layout object is instantiated with member circuit objects established therein for placement in the circuit schematic. A user may also execute the user interface layer 104 to specify, in advance of placement of the layout object, which member circuit objects are to be instantiated with the layout object.

Layout module 108 is also executed to edit or modify established layout objects in the schematic design, such as by the addition of a circuit object. For example, a user executes layout module 108 to add capacitors to a bypass rail. A layout object with a number of member circuit objects, such as capacitors, disposed therein maintains predetermined relationships amongst the member circuit objects, including such constraints and attributes as inter-object spacing, margin spacing, relation, rotation, intercoupling amongst components, and the like.

Figure 11B:
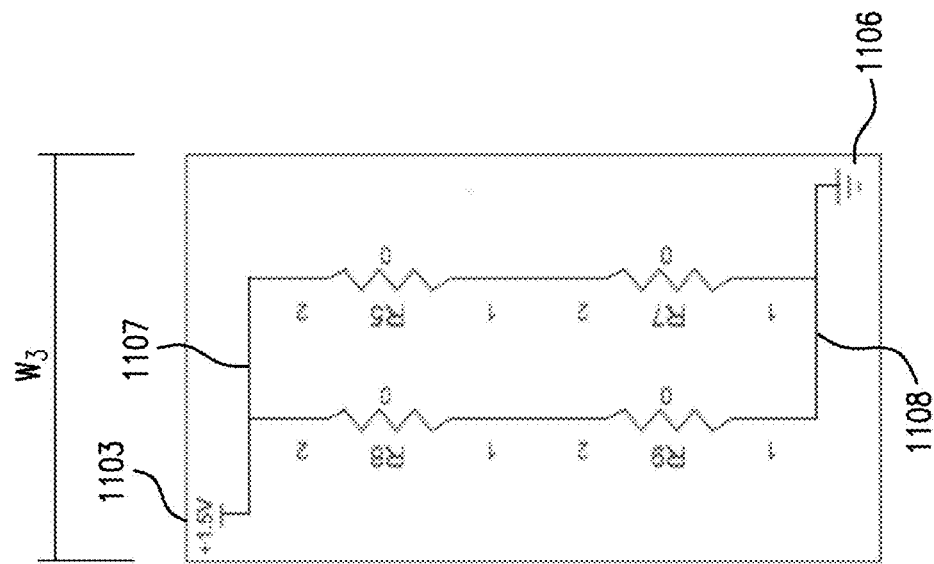
FIG. 11B is an illustrative representation of a reconfigured layout object illustratively displayed in a portion of a graphic user interface generated during computer execution resulting from an adaptive merge action in accordance with an exemplary embodiment of the present invention.
Figure 11A:
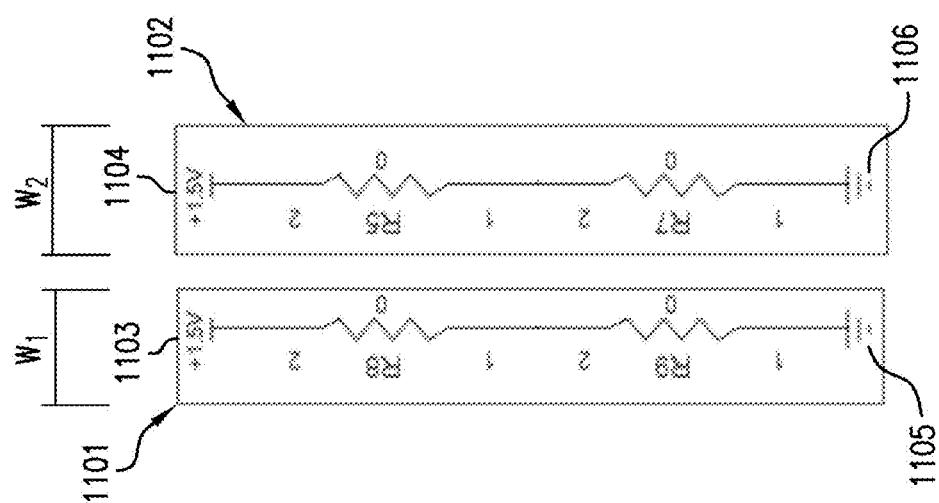
FIG. 11A is an illustrative representation of two layout objects as illustratively displayed in a portion of a graphic user interface generated during computer execution in accordance with an exemplary embodiment of the present invention.

The group of member circuit objects may be collectively manipulated as a layout object by layout module 108 and user interface layer 104 rather than individually manipulated as individual, distinct, and separate circuit objects having no association. A user may employ layout module 108 via the user interface layer 104 to manipulate layout objects themselves, such as, for example: merging pre-established layout objects (like the merging of two Thevenin terminations into a single Thevenin termination as illustrated in FIGS. 11A and 11B).

A layout object includes a grouped plurality of constituent circuit objects, and may be moved collectively. Suitable user-operable controls like peripheral handles and visual indicia like layout object peripheral highlighting may be employed in this regard. Accordingly, a user may simply and conveniently move the layout object as a whole on the canvas of the circuit schematic, without having to worry about individually rearranging and reconnecting its constituent circuit objects. A user may operate peripheral handles, menu objects, context menus, and the like to apply a rotation, mirroring, resizing, and the like.

A layout object may be resized such as by a user specifying a greater allowed space or area on the schematic design canvas. In similar manner, the layout object may be resized to occupy less space on the schematic design canvas. According to the resizing edit of the layout object, the member circuit object group is accordingly reconfigured following the layout strategy to reposition the member circuit objects and their interconnections while maintaining compliance with the pre-established constraints such as placement and interconnect scheme, including inter-component spacing, margin spacing, connectivity, and the like.

For example, in a bypass rail, a first specified layout object size may allow for a 4×4 grid of capacitors arranged in accordance with the layout strategy's placement and interconnect scheme. Following a resizing operation however, the layout object may be allotted less space on the schematic design and the 4×4 arrangement of capacitors may be reconfigured according to the placement scheme of the layout strategy to an 8×2 disposition.

Layout module 108 may be employed through the user interface layer 104 to create a nested, hierarchical, or complex (used interchangeably) layout object comprising sub-layout or primitive layout objects. For example, a user may combine a first layout object with a second layout into a third layout object. Thereby, nested, complex layout objects are established through the composite definition of a plurality of member primitive layout objects.

Additionally, a user (or other task, process, thread, tool, or the like) may edit the attributes or constraints of a predefined layout object. For example, internal spacing constraints, margin spacing constraints, and the like may be modified by a user or automated process. In such manner, a plurality of circuit objects may be collectively manipulated as a singular logical unit maintaining relationships amongst member circuit objects.

Figure 2:
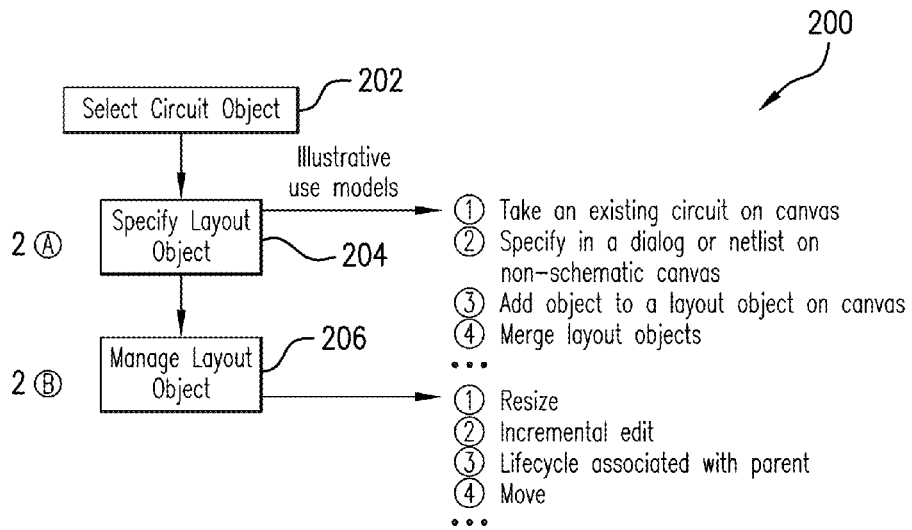
FIG. 2 is a flow diagram illustrating an overall flow for applying layout strategies to schematic objects carried out in accordance with an exemplary embodiment of the present invention.

Referring now to FIG. 2, an exemplary flow 200 is illustrated for manipulating a group of circuit objects as a singular layout object. At block 202, a user may select a circuit object preestablished within a given circuit schematic or may select a predefined circuit object from a library or other such data store of predefined circuit objects for inclusion in a layout object.

At block 204, a layout object is acquired by obtaining member circuit objects in various ways. Circuit objects may be selected for the layout object from the circuit schematic, manually created on a graphic canvas, or may be specified otherwise. Accordingly, a user may selectively incorporate pre-established circuit objects on the schematic canvas for inclusion into a layout object. The member circuit objects so obtained will thereafter be reconfigured in accordance with the layout strategy. The circuit objects may be selected by any suitable measures known in the art, such as by selection with a pointing device or the like.

Alternatively, a user may specify to instantiate new circuit objects with a new layout object. Such circuit objects being instantiated have not been already established in the schematic canvas. A user interface dialog box or tabular list such as seen, for example, in FIG. 6, command line, or the like, may engage the user for specification of the circuit objects for inclusion in the layout object.

Unit 204 further enables a user to insert or remove circuit objects to a pre-established and placed layout object existing on the schematic canvas. This may be effected by, for example, dragging and dropping a graphic representation of a new circuit object, such as a capacitor, transistor, logic AND gate, or the like onto the pre-placed layout object. The layout object is then redefined to include that circuit object. Membership attributes or fields of the added circuit object/s are updated accordingly to reflect this modification to the layout object.

In defining the constituency of the layout object, a plurality of primitive layout objects may be defined within another layout object to form a new complex layout where each constituent primitive layout retains their identity, or merged to form a new primitive layout object incorporating the member circuit objects of each of the individual layout objects that existed prior to the existing operation. For example, if a first layout object contains a Thevenin termination and a second layout object contains a second Thevenin termination, merging the two layout objects creates a new layout object including both of the Thevenin terminations therein. Alternatively, a complex layout object may be formed with a hierarchical structure containing a number of primitive layout objects, each retaining their separate identity.

The layout object may be specified in hierarchical manner by the incorporation of primitive layout objects therein. For example, a first layout object may contain two subordinate layout objects each defined in relation to the other and placed within the complex layout object thereof while still maintaining their separate individuality as layout objects themselves and maintaining collective control over their own circuit objects disposed therein.

Figure 2A:
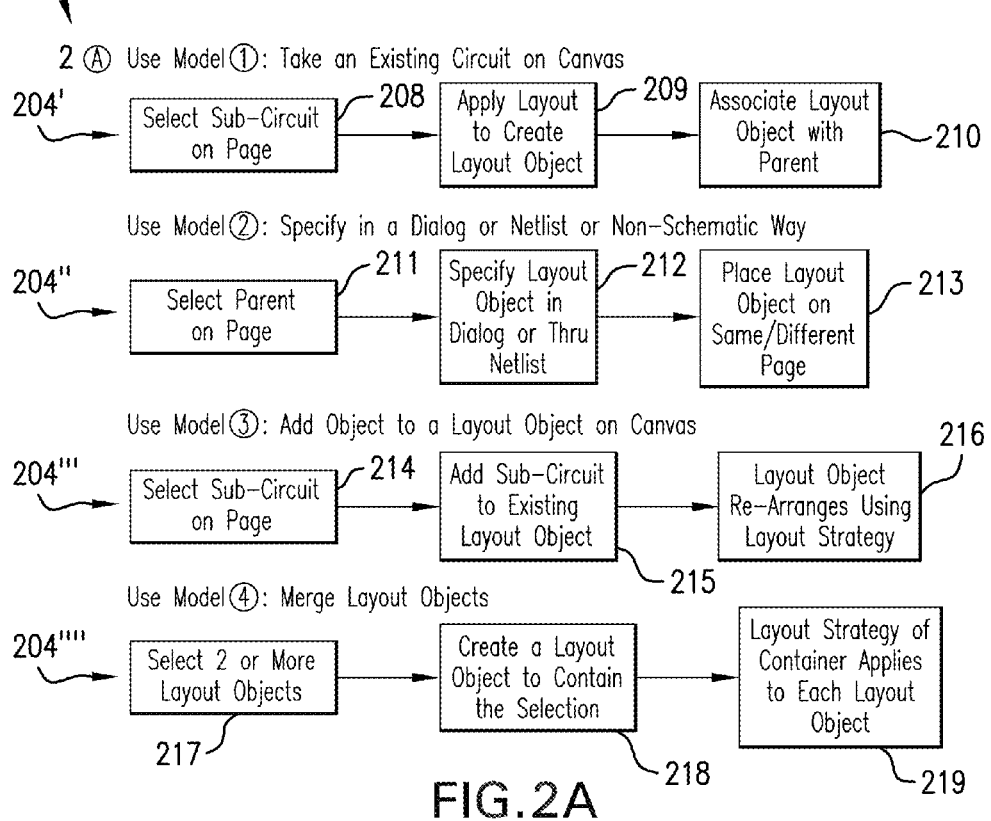
FIG. 2A is a flow diagram illustrating a flow of processes in a portion of the exemplary embodiment illustrated in FIG. 2.

FIG. 2A provides a more detailed view of a portion of the illustrative flow of processes 204 for acquiring a layout object. A flow 204' for applying an existing circuit (including at least one circuit object) on canvas to a layout object is illustrated. At block 208, a sub-circuit or at least one circuit object is selected on a page of the canvas displaying a circuit schematic. The user may effect the selection through the given graphic user interface by any suitable measures known in the art including by a user pointing and clicking a mouse object. Additional modifier keys such as control or shift keys may be employed while clicking the mouse to select more than one circuit object.

When the user has completed selecting circuit objects, the user may apply a layout strategy (defined in advance or at object selection) to the selected circuit objects to create a layout object according to that layout strategy. After applying a layout strategy, the layout object will be formed to include a reconfigured arrangement of the circuit objects originally selected.

At block 210, the newly generated layout object is then associated with a circuit object which functions as a parent object. A parent object is a circuit object to which a layout object is associated (generally associated circuitry). An exemplary parent may be a circuit, chip, or a microprocessor and the complementary associated layout object may be a bypass rail, or the like. Another exemplary parent and associated layout object may be a pin, terminal, or node of a chip and an associated Thevenin termination. If no parent object exists, the layout objects may be associated with a particular page or canvas of the circuit schematic. Circuit objects related to the logic operation of the circuit design, such as AND, OR, NOR gates, combinational logic, sequential logic, memory, flip flops, transistors, and the like are generally considered parent circuit objects while associated circuitry relate to any part of the circuit design which does not contribute to the digital logic, but instead operates to preserve proper circuit operation within the analog realm. Examples include circuitry for regulating voltage, filtering noise, and the like.

An illustrative flow of processes 204″ are shown for creating an associated layout object from at least one unplaced circuit object. At block 211, a user selects a parent circuit object on a page of the circuit schematic. Such selection may be of any suitable circuit object in the circuit schematic, for example, another microprocessor, digital logic circuit object, system-on-chip, or the like. According to the selected parent object, one or more candidate associated circuitry layout strategies for objects may be presented to the user for selection. For example, where the user selects a microprocessor, a plurality of predefined layout strategies to create layout objects may be presented to the user as a suggestion for the user's selection based on the type of parent selected. One such proffered circuit layout strategy may include a Thevenin termination, a bypass rail, or the like.

At block 212, the user may select the desired layout object strategy such as via a dialog box or through editing of netlist data. According to the user's selection, at block 213, the selected type of layout object is instantiated according to the layout strategy and is provided to the user for placement thereof. Such placement is preferably effected by providing a semi-transparent outline of the selected layout object attached to the user's pointing device cursor. As the user's cursor moves and traverses through the circuit schematic, the outline of the intended layout object to be placed follows the movement of the cursor.

Upon clicking of the pointing device, the associated circuitry defined by the layout object may be placed by the user in the circuit schematic. Any suitable measures known in the art for effecting the placement, selection, and the like may be employed. Additionally, as the layout object being placed is moved through the circuit design, a plurality of interconnective wire segments or links may dynamically follow the candidate placement of the layout object. Such links are adaptively reconfigured dynamically considering their imposed placement and interconnect routing scheme constraints. The placement of these links is effected upon selection of a location for placement of the layout object in the circuit schematic. The associated circuit object is thereby automatically coupled to its corresponding parent circuit object.

A flow of processes for adding a pre-existing circuit object to a layout object on a canvas 204‴ is illustrated beginning at block 214. At block 214, a user selects at least one circuit object pre-established on a visible page of the circuit schematic. At block 215, a user may drag the selected circuit object or objects into a pre-established layout object where the selected circuit objects will be incorporated into the pre-existing layout object. The resulting set of member circuit objects within the layout object are then reconfigured in accordance with the pre-established layout strategy. In reconfiguring the member circuit objects within the layout object, care is taken to ensure constraints such as inter-object spacing, margin spacing, and the like are maintained—as specified in the placement and interconnect routing schemes. Such constraints may be queried from the circuit design data or layout strategy file and compared dynamically with attribute or member variables of the member circuit objects. Responsive to a failure of compliance, the user may be warned or appropriate remedial measures may be taken.

An exemplary flow of processes for merging different layout objects together 204″″ is illustrated starting at block 217. At block 217, two or more layout objects are selected by a user in such manner as described above. At block 218, a new layout object is instantiated to hold the selected subordinate layout objects. The selected subordinate layout objects are then arranged into the parent layout object to form a hierarchical or complex layout object (used interchangeably herein). The layout strategy of the hierarchical layout object is then applied at block 219 to each of the subordinate layout objects encompassed by the hierarchical parent layout object.

Figure 2B:
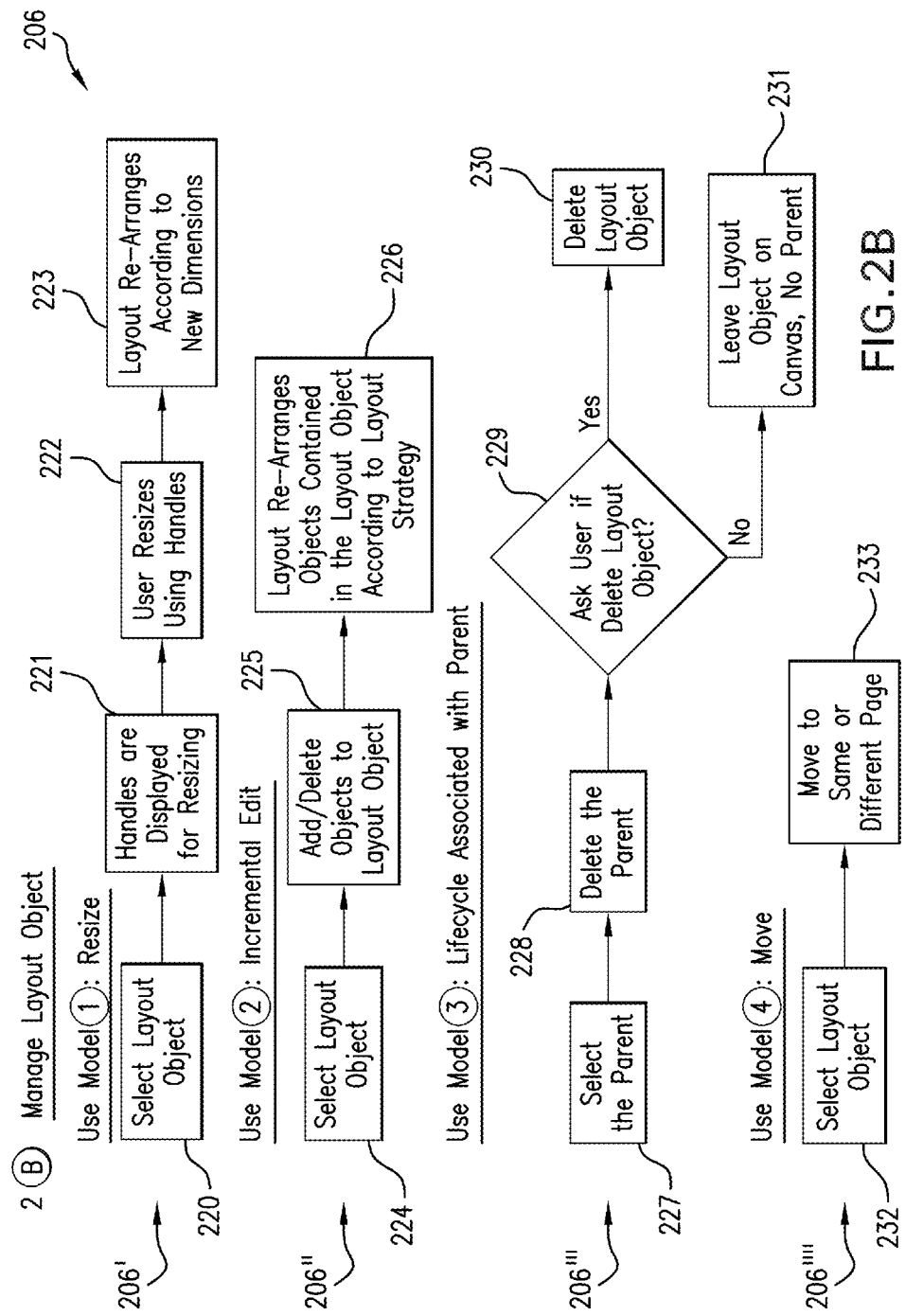
FIG. 2B is a flow diagram illustrating a flow of processes in another portion of the exemplary embodiment of illustrated in FIG. 2.

Referring now to FIG. 2B, a number of illustrative flows 206', 206″, 206‴, and 206″″ of processes are shown for managing a layout object. The exemplary flows of processes seen in FIG. 2B illustrate measures for managing or manipulating a selected layout object.

A resizing operation 206' is illustrated starting at block 220. At block 220, a layout object pre-established in a circuit schematic is selected. A plurality of user-operable handles graphically defined around a peripheral border of the layout object upon selection thereof are preferably displayed at block 221 responsive to the selection to allow a user to adjust the size, also referred to as dimensional constrains, of the layout object such as, for example, by dragging the handles. At block 222, the user selects at least one handle and drags in either an outward direction to expand the scope of the currently selected layout object or on the other hand, inwards towards the center of the layout object to reduce the size thereof. The layout object is correspondingly extended or reduced in an X component of the movement and extended or reduced in a Y component of the movement. At block 223, the layout object rearranges or adaptively reconfigures the arrangement of the member circuit objects within the layout object according to the strategy while maintaining the constraint of the specified size responsive to the instant resizing operation. Routing is responsively performed to maintain connectivity of the member circuit objects while complying with other applicable constraints.

A flow of processes 206″ for incremental edit of a layout object is seen starting at block 224 where a layout object in the circuit schematic is selected. A user may add or delete circuit objects in the layout object at block 225. The user may effect addition or deletion of circuit objects such as by the selection of an object within a layout object and employing a context menu, a button on the keyboard for the removal thereof, a tool bar icon, or the like. Indeed, any suitable measures known for deleting a graphical representation of an object may be employed.

To add a circuit object to a layout object, a user may select, hold, and drag an existing circuit object situated outside of the layout object into an area within the bounds of the layout object. Additionally, a user may add a circuit object by any other measures known such as the use of the menu bar, tool bar, a right click context menu, or the like. A user may edit a tabular listing of member circuit objects and ports to add or remove objects. Responsive to the addition or deletion of an object, at block 226, the constituent member objects within the layout object are automatically rearranged according to the layout strategy thereof. Such triggering of reconfiguration may be responsive to user input, responsive to detected changes to a connectivity database such as a netlist, responsive to changed dimensionality constraints, or the like. Whenever a user performs an action resulting in a change to a member circuit object, a query may be run against the connectivity database to determine if other requisite changes are in order for reconfiguration according to the layout strategy, and should be executed.

Certain layout objects such as, for example, a Thevenin termination, or a bypass capacitor rail, are generally not used in a circuit design in isolation, but rather, are associated with a parent object such as a microprocessor, an integrated circuit (IC) chip, or the like. An exemplary flow of processes for maintaining association or for manipulating an associated layout object according to the parent object 206''' is illustrated starting at block 227. At block 227, a parent circuit object such as, an integrated circuit chip is selected. At block 228, a user may delete the IC chip parent. At block 229, an evaluation is executed, for example, presenting a dialog box to a user to query for deletion of the layout object associated with the parent which has been deleted. If the user selects "YES," then the flow proceeds to block 230 where the associated layout object is deleted with the deletion of the parent object. On the other hand, if the user selects "NO" at block 229, then the associated circuitry of the layout object is not be deleted and is instead, at block 231, left intact on the canvas of the circuit schematic.

Another exemplary flow of processes for manipulation or management of the established layout object 206'''' is illustrated. At block 232, a layout object in the circuit schematic is selected. At block 233, a user may drag the selected layout object to any other available portion amongst the pages of the circuit schematic canvas. One exemplary measure for effecting such move is by a user appropriately actuating a mouse input device, dragging the layout object on the canvas, and as the layout object approaches a corner of the visible canvas, panning a user's view of the canvas in an opposing direction as if the layout object itself were traversing in the original direction beyond the bounds of the visible portion of the page or canvas. Upon the user releasing the mouse button, the layout object is placed at the last X, Y coordinate position of the mouse.

Turning now to FIG. 3A, an exemplary flow for applying a layout strategy 300 to at least one preestablished circuit object is shown. At block 302, selected circuit objects and the connectivity thereof are passed to the layout object acquisition unit which reads the layout strategy to be applied to the selected components and corresponding connectivity at block 303. The layout strategy is applied at block 304 to the components while maintaining compliance with the given constraints. If compliance with the specified constraints is not possible with the application of the selected layout strategy to the selected components, then a valid layout object is not generated, but instead an error is returned and reported at block 305. The error reporting at block 305 preferably offers the cause of the error and suggested remedial steps to allow valid generation. On the other hand, if the layout may be successfully applied to the selected circuit objects and the connectivity thereof, then a valid layout object is generated and placed for display on the canvas of the circuit schematic at block 306.

Referring to FIG. 3B, a resizing flow 301 is shown starting at block 307. A layout object is selected at block 307. Responsive to user manipulation such as by a mouse applied to drag handles at distal edges of the layout object and thereby resize the layout object, the new dimensions are accepted by the layout object management unit at block 308. At block 309, the layout strategy is attempted to be applied to the selected layout object by re-configuring the member circuit objects thereof according to the new dimensional constraints set at block 308. If the layout strategy, and specifically, the placement and interconnect routing schemes may not be applied while complying with the dimensional constraints set at block 308, then an error is reported at block 310 and the resizing operation 301 is aborted. The error at block 310 preferably discloses the cause of the error and suggested remedial measures. If on the other hand, the layout strategy may be applied to the layout object by reconfiguring the member circuit objects without violating the dimensional constraints set at block 308, then the modified layout object is re-rendered graphically and displayed on the canvas of the circuit schematic at block 311.

Figure 4:
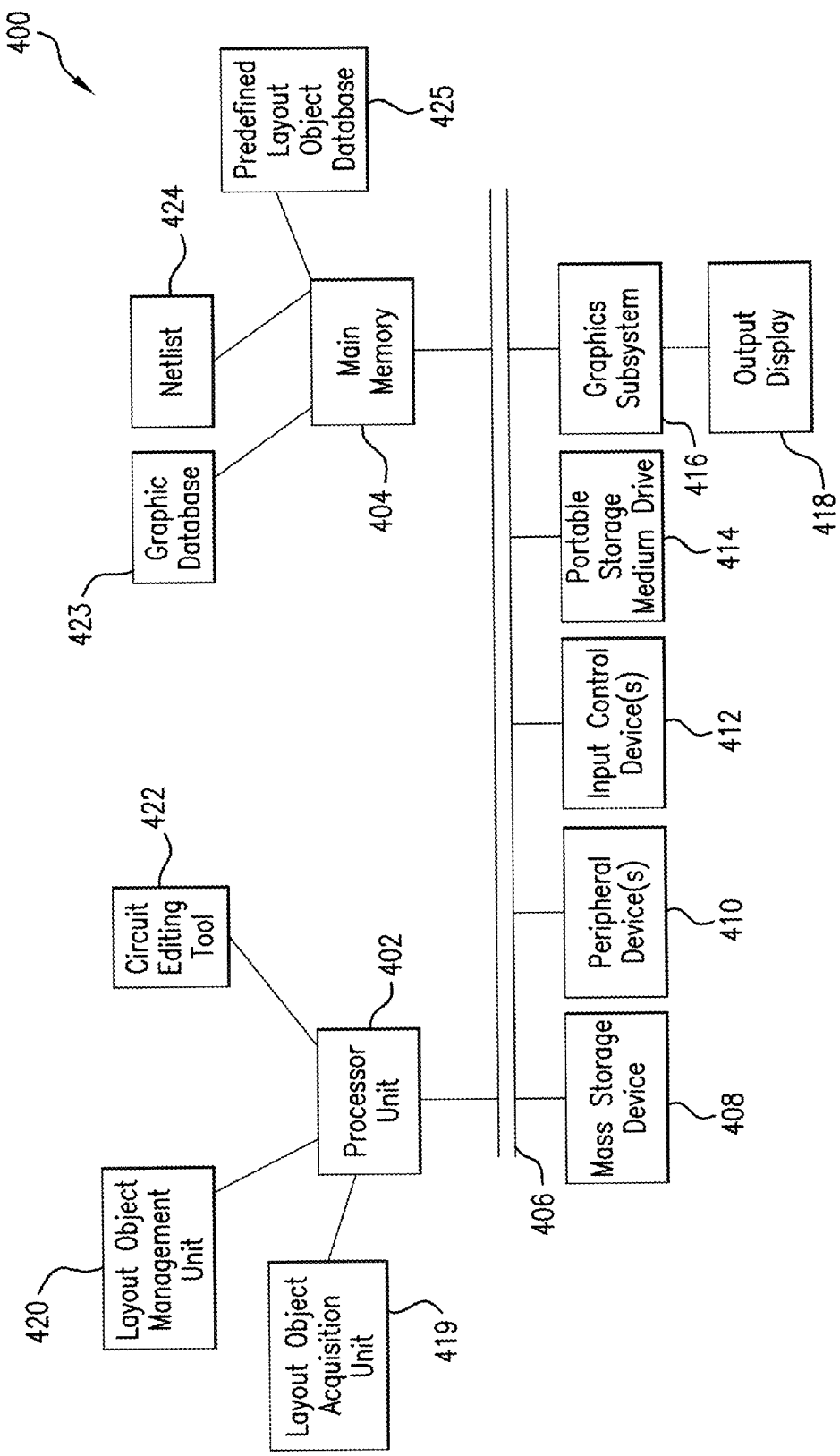
FIG. 4 is a block diagram illustrating an interconnection of components in a processor-based system implemented in accordance with an exemplary embodiment of the present invention.

Turning to FIG. 4, an illustrative block diagram of a computer system for hosting and/or executing an exemplary configuration of the disclosed system and method respectively is illustrated. A computer system 400 contains a processor unit 402, a main or primary memory 404, an interconnect bus 406, a mass storage device 408, peripheral device(s) 410, input control device(s) 412, portable storage drive(s) 414, a graphics subsystem 416, and an output display 418, amongst other components. Portions of system 400 may be incorporated into one or more system on chip (SOCs). Processor unit 402 may include a single microprocessor or a plurality of microprocessors for configuring computer system 400 as a multi-processor system, additionally, each physical processor unit 402 may include a plurality of cores. Main memory 404 stores, in part, instructions and data to be executed by processor 402 along with circuit design data including circuit design, operational timing data, topology data, and structural data, amongst other relevant data. Main memory 404 preferably includes banks of dynamic random access memory (DRAM) as well as high-speed cache memory, such as static random access memory (SRAM) at various levels of the system architecture.

For the purpose of simplicity, the components of computer system 400 are shown connected via interconnect bus 406. However, computer system 400 may be connected through one or more data transport means. Mass storage device 408, which may be implemented with a magnetic disk drive, an optical disk drive, a solid state device such as a flash device, an attachment to network storage, cloud storage, a RAID arraying any of the above, and the like, is preferably a non-volatile storage device for storing data, databases, and instructions, to be used by processor unit 402. In certain configurations, mass storage device 408 may store portions of the software to load it into main memory 404 or into a firmware or rom. Mass storage device 408 is preferably employed to store and provide access to circuit design data, including netlist data 424, extrinsic data, separate files maintaining associations, meta data, and a graphic database 423, among other data sources. Such databases, data stores, tables, circuit design data, and the like are preferably retrieved from mass storage device 408 and at least portions thereof are stored in main memory 404 to provide faster reading and writing access thereto. Periodic synchronizing measures are taken between the volatile main memory 404 and non-volatile mass storage devices 408 to ensure accurate data archival. Selective loading of pages of schematic design is employed responsive to use history, current usage, and anticipated usage for parent objects and their associated circuitry layout objects as well as other circuit objects.

Portable storage medium drive 414 operates in conjunction with a portable non-volatile storage medium such as a floppy disk, a compact disk read only memory (CD-ROM), a digital versatile/video disk read only memory (DVD-ROM), or the like, to input and output data and code to and from the computer system 400. In one configuration, software portions, circuit design data, and the like are stored on such a portable medium, and are input to computer system 400 via portable storage medium drive 414.

Peripheral device(s) 410 may include any type of computer support/extension device such as an input/output (I/O) interface, such as, for example PCI express or gigabit Ethernet, though any suitable 10, backplane, or other suitable interface may be employed to add additional functionality to computer system 400. For example, peripheral device(s) 410 may include additional network interface cards to interface computer system 400 to additional networks, servers, clusters, farms, or facilities, such as a separate semiconductor fabrication plant. Peripheral devices 410 or processor unit 402 may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 400 through peripheral device(s) block 410 or processor unit block 402. Still further, specialized application specific integrated circuits (ASICS) may be coupled thereto to implement specialized logic to accelerate or implement certain portions of the invention such as a capture unit, visual cue management unit, and the like. Such units may be given direct memory access (DMA) and may have their own memory integrated therein. Additionally, a rapid circuit prototype fabrication unit may be coupled to the system via a backplane, system IO port, network connection, or the like. Such fabrication unit may include, for example, a lithographic or 3d additive printer, operable to physically fabricate a circuit design defined by circuit data. An IC product prototyping machine/(s) produces a prototype physical IC product embodying at least one circuit design such as by combinations of optical lithography, etching, carbon vapor deposition (CVD), additive 3d printing, or the like, though any suitable measures for fabricating an IC product embodying the transformed circuit design may be employed.

Layout object acquisition unit 419, layout object management unit 420, and circuit editing tool 422 are coupled to the processor unit 402. The layout acquisition and management units 419, 420 are preferably integrated into the circuit editing tool 422. Such units may be implemented external to the processing unit 402 or may be formed as co-processors, cores, or any other suitable arrangement may be employed. A graphic database 423 and net list 424 are stored within main memory 404. Additionally, the graphic database 423 and net list 424 may be stored within mass storage device 408. A layout object database 425 may also be stored in main memory 404 and mass storage device 408.

Input control device(s) 412 provide a portion of the user interface for a computer system 400 user. Input control device(s) 412 may include an alphanumeric keypad for inputting alphanumeric and other key information; and a cursor control device such as a mouse, a track pad or stylus; or cursor direction keys.

In order to display textual and graphical information, computer system 400 contains graphic subsystem 416 and output display(s) 418. Output display 418 may include a cathode ray tube (CRT) display, liquid crystal display (LCD), active matrix organic light emitting diode (AMO-LED), plasma display, projector, or the like. Graphic subsystem 416 receives textual and graphical information and processes the information for output to display 418. Additionally, a printer, plotter, drafter, or any other suitable tangible output generator may be employed. For example, a user may print out a paper copy of the schematic or any portion thereof including the visual cues for parent circuit object and associated circuitry.

In a software implementation, portions of the software for certain measures may include a plurality of computer executable instructions, to be implemented on a computer system such as system 400. Prior to loading in the computer system 400 or firmware, the software may reside as encoded information on a non-transitory computer-readable tangible medium such as a magnetic floppy disk, a magnetic tape, CD-ROM, DVD-ROM, flash memory, network attached storage (NAS), or any other suitable computer readable medium. Such software may control multiplexors, selectors, field programmable gate arrays (FPGAs), ASICS, or the like to implement logical control of certain features herein, such as, for example, layout object acquisition, manipulation, parent/associated layout object navigation, circuit editing, schematic capture, and the like.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figures 5A, 5B:
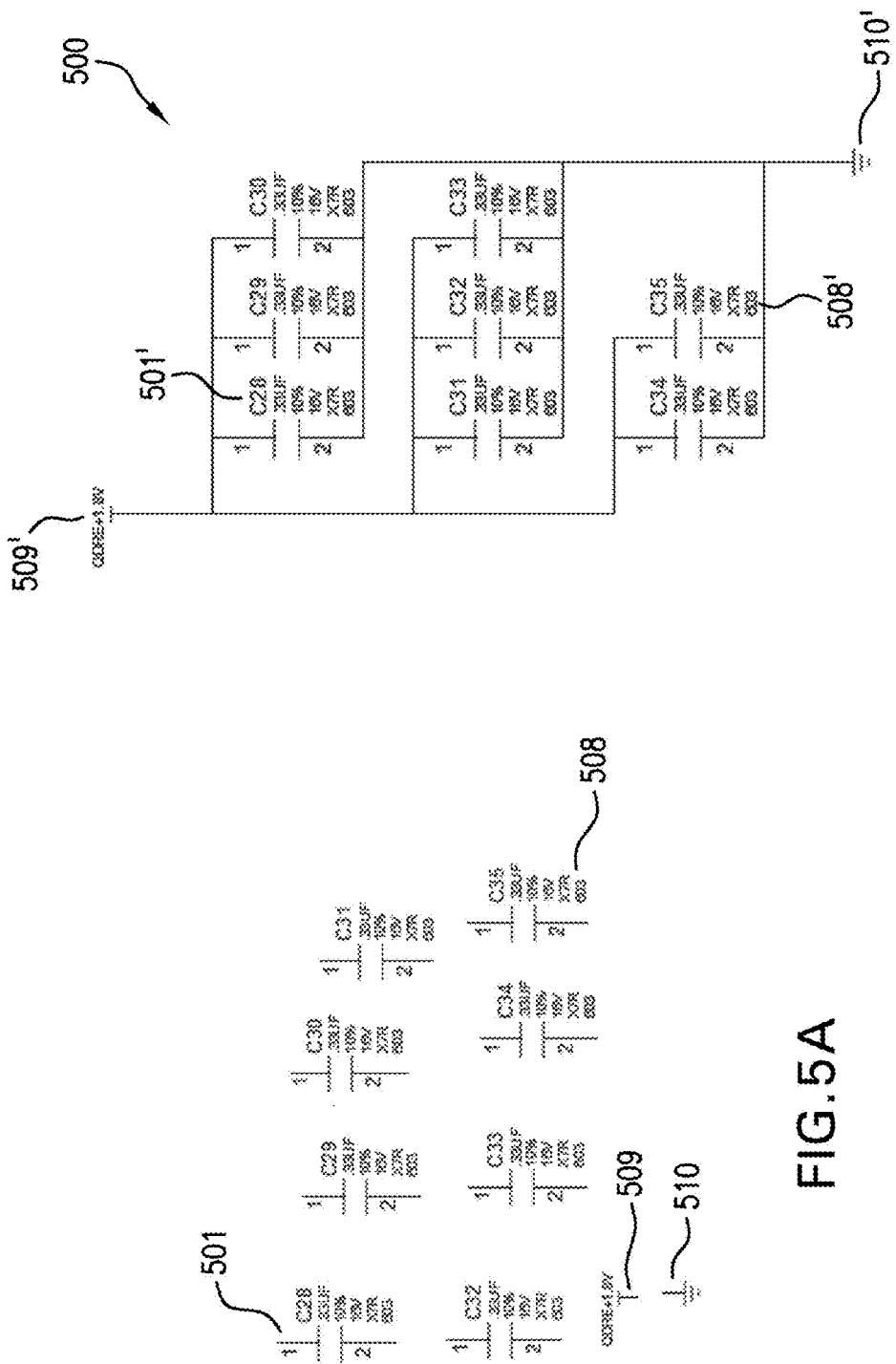
FIG. 5A is a schematic diagram illustrating an ungrouped plurality of objects graphically rendered by a circuit editing tool formed in accordance with an exemplary embodiment of the present invention.
FIG. 5B is a schematic diagram illustrating a layout object reconfigured in accordance with a predefined layout strategy including the circuit objects illustrated in FIG. 5A.

Referring now to FIG. 5A, an exemplary ungrouped plurality of circuit objects not belonging to a layout object, in this case capacitors "C28" 501 to "C35" 508, are illustrated. Additionally, a power source 509 and a ground sink 510 are shown as well. If a user selects the capacitors 501-508, power 509, and ground 510, and chooses to apply a layout strategy to the selected circuit objects, then a new layout object 500 (as seen in FIG. 5B) is instantiated and the circuit objects 501-510 are reconfigured according to the layout strategy and dimensional constraints which are predefined. Accordingly, layout object 500 includes relative placement of the power port 509' symbol in the upper left-hand corner; the ground port 510' symbol in the lower right-hand corner; and a number of rows and columns of the capacitors 501'-508' adaptively set to fit within dimensional constraints including inter-object spacing, margin spacing, and the like. By utilizing a known, uniform, layout strategy with recognizable placement schemes, certain characteristics of the layout object may be discerned from a quick glance by a designer. For example, a designer may not be able to recognize FIG. 5A as a bypass rail easily, but would be more likely to quickly ascertain that the layout object illustrated in FIG. 5B is, indeed, a bypass rail.

Figure 6:
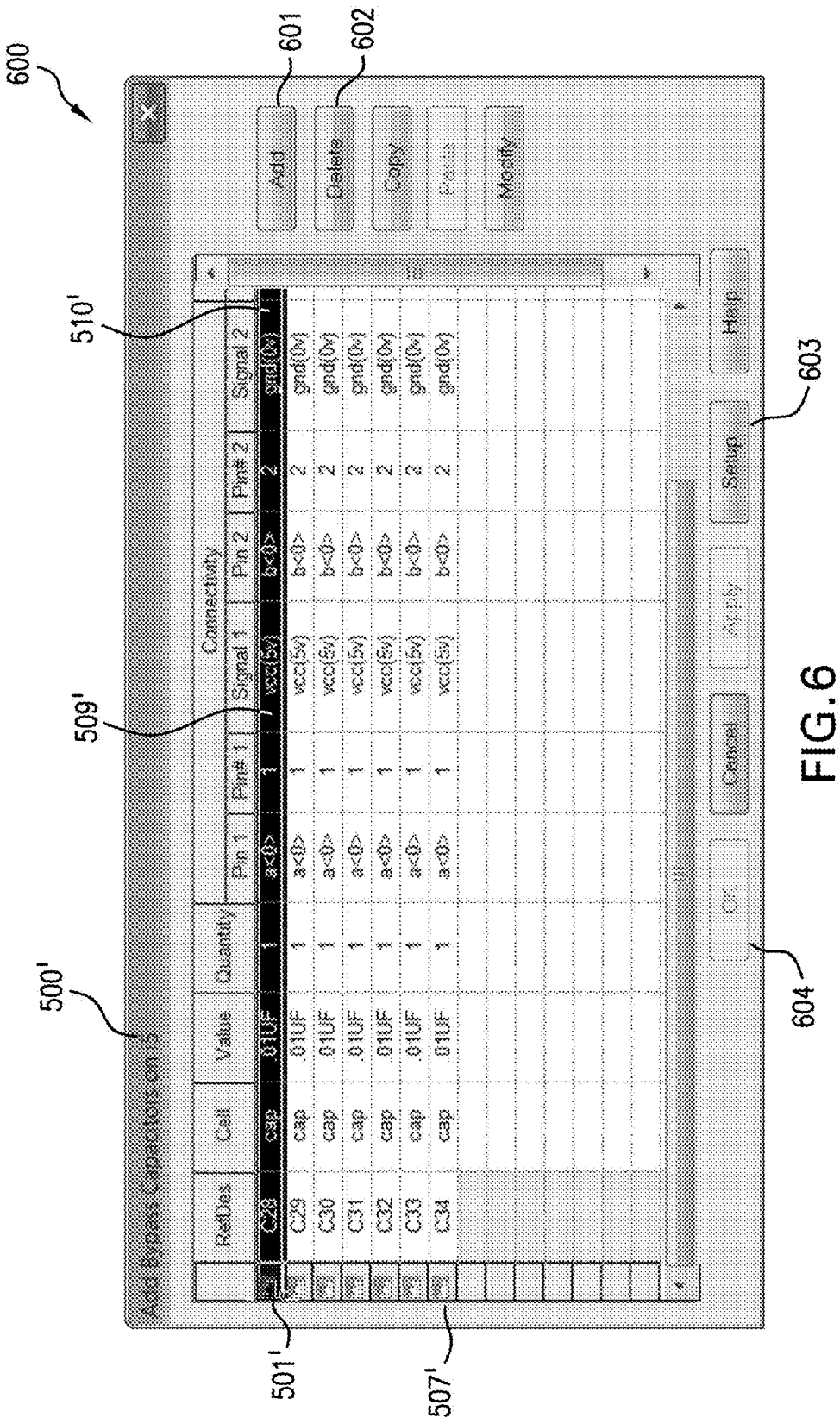
FIG. 6 is an illustrative representation of a portion of a graphic user interface generated during computer execution incorporating a number of circuit objects selectively included in a layout object in accordance with an exemplary embodiment of the present invention; and, FIG. 7 is an illustrative representation of a portion of a graphic user interface for circuit editing tool generated during computer execution incorporating a circuit object in accordance with an exemplary embodiment of the present invention.

Referring now to FIG. 6, a portion of a graphical user interface 600 for establishing a layout object with unplaced circuit objects is illustrated. Unplaced circuit objects 501'-507' include a number of capacitors "C28" to "C34." The power port 509' and ground port 510' are specified as well. Such ports are generally treated as circuit objects for clarity and brevity herein. Another portion of the GUI 600 accessed via the setup button 603 displays and provides for modification of a plurality of attributes or constraints which may be specified for the layout strategy such as inter-object spacing, margin spacing, dimensionality, and the like.

Additional non-placed circuit objects may be added through a user operable control 601 such as an "Add" button. Circuit objects may be removed from the layout object through activation of the "Delete" user-control 602. When the user has completed adding circuit objects to the layout object, the user may actuate the "OK" user control 604 to generate the layout object according to the specified circuit objects, the selected layout strategy and the constraints specified therein. The layout object is then instantiated and placed in the circuit schematic visible canvas portion of the GUI with corresponding changes made to the circuit design and connectivity database, such as the netlist.

Another portion of an exemplary graphical user interface 700 is illustrated displaying an exemplary parent circuit object 702 and a user interface context menu portion 703. In this instance, the context menu 703 provides for effecting a placement of a bypass rail or other associated layout object. The bypass rail is an associated circuitry layout object relative to the parent circuit object 702. Such illustrative view is merely exemplary as any suitable measures known in the art to effect placement of an associated layout object may be employed and any associated circuitry may be placed.

Figure 7:
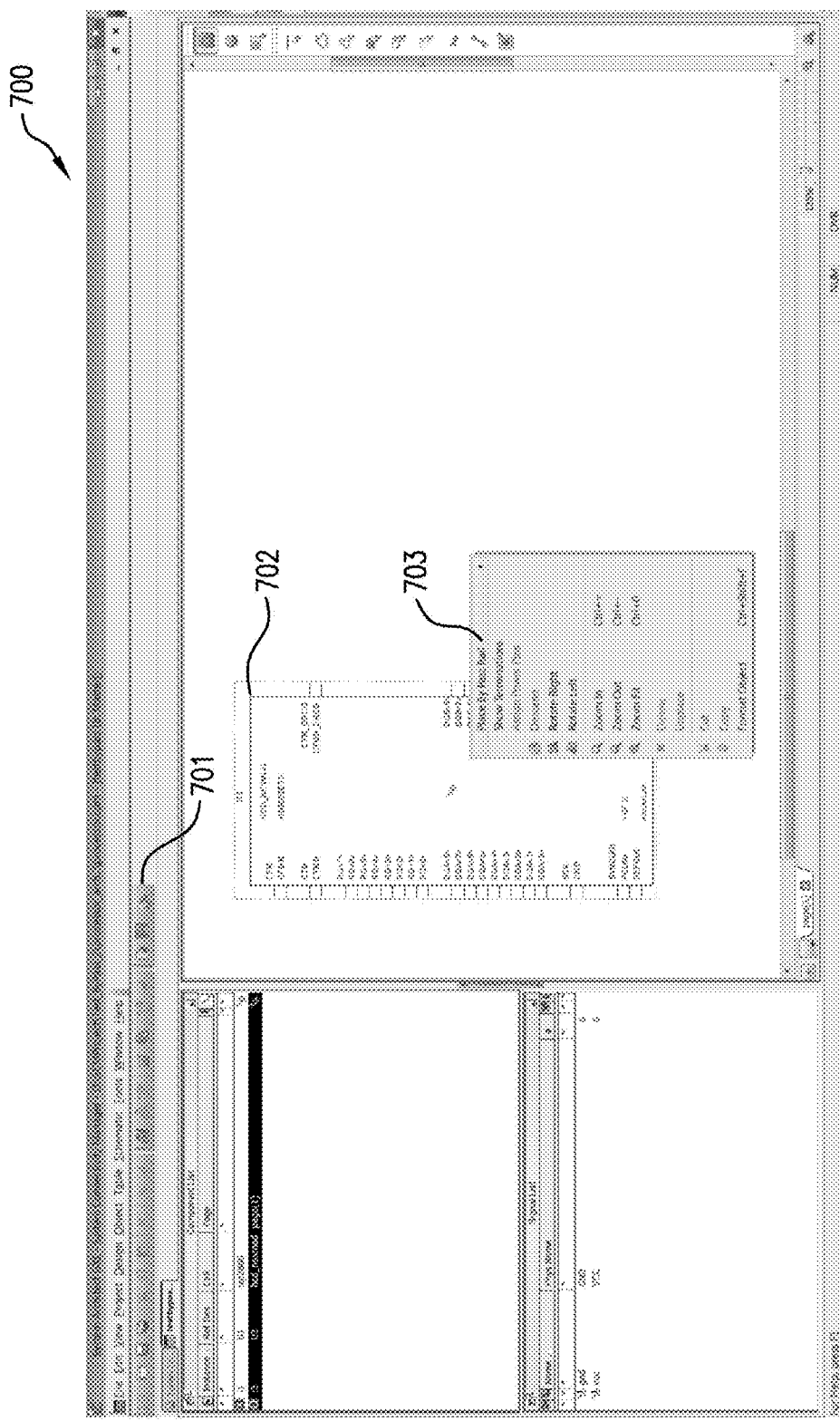
Figure 8:
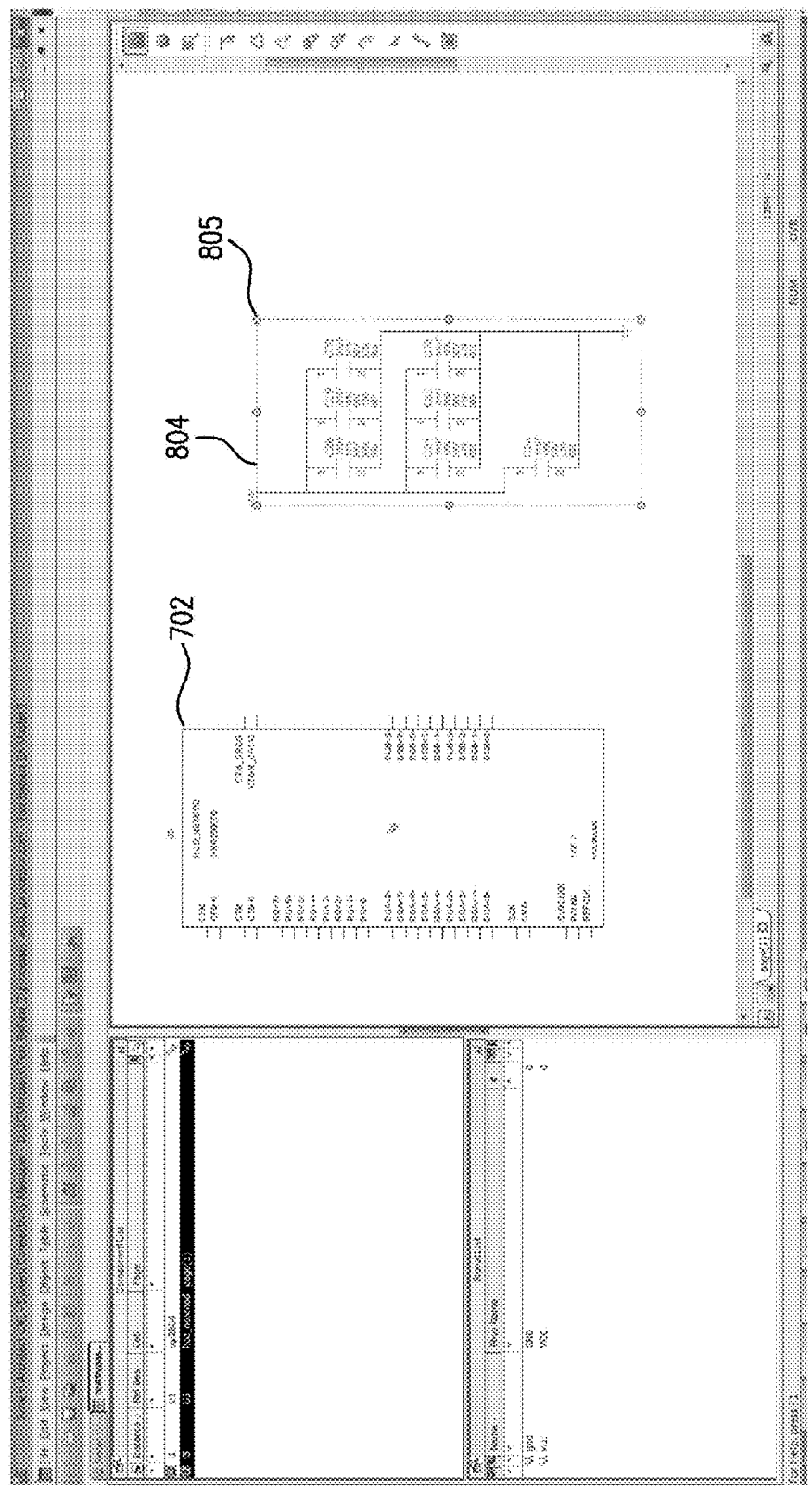
FIG. 8 is another illustrative representation of a portion of the graphic user interface generated during computer execution incorporating a circuit object and an associated layout object in accordance with an exemplary embodiment of the present invention.

Turning now to FIG. 8, responsive to a user actuating the context menu 703 as seen in FIG. 7 for a parent circuit object 702, an associated layout object 804 is placed in the canvas area of the graphical user interface 700 for graphic display thereof. Layout object 804 contains the circuit objects 501-507 established in the graphical user interface of FIG. 6 or the circuit objects 501-510 pre-established in the circuit schematic as seen in FIG. 5A. The circuit objects are adaptively configured based on constraints and the layout strategy. If the circuit objects are able to be adaptively arranged within the area determined by relevant attributes and constraints, then the layout object 804 is rendered and placed in the schematic; otherwise, an error is reported. Responsive to the error, the user may manipulate handles 805 to resize the dimensional constraints of the layout object 804. According to the resizing action, the layout strategy is again attempted to be adaptively employed to reconfigure the member circuit objects within the layout object to comply with the constraints established thereon. If this reconfigure is successful, an associated layout object is graphically rendered in the circuit schematic with corresponding updates to the connectivity database.

Figure 9:
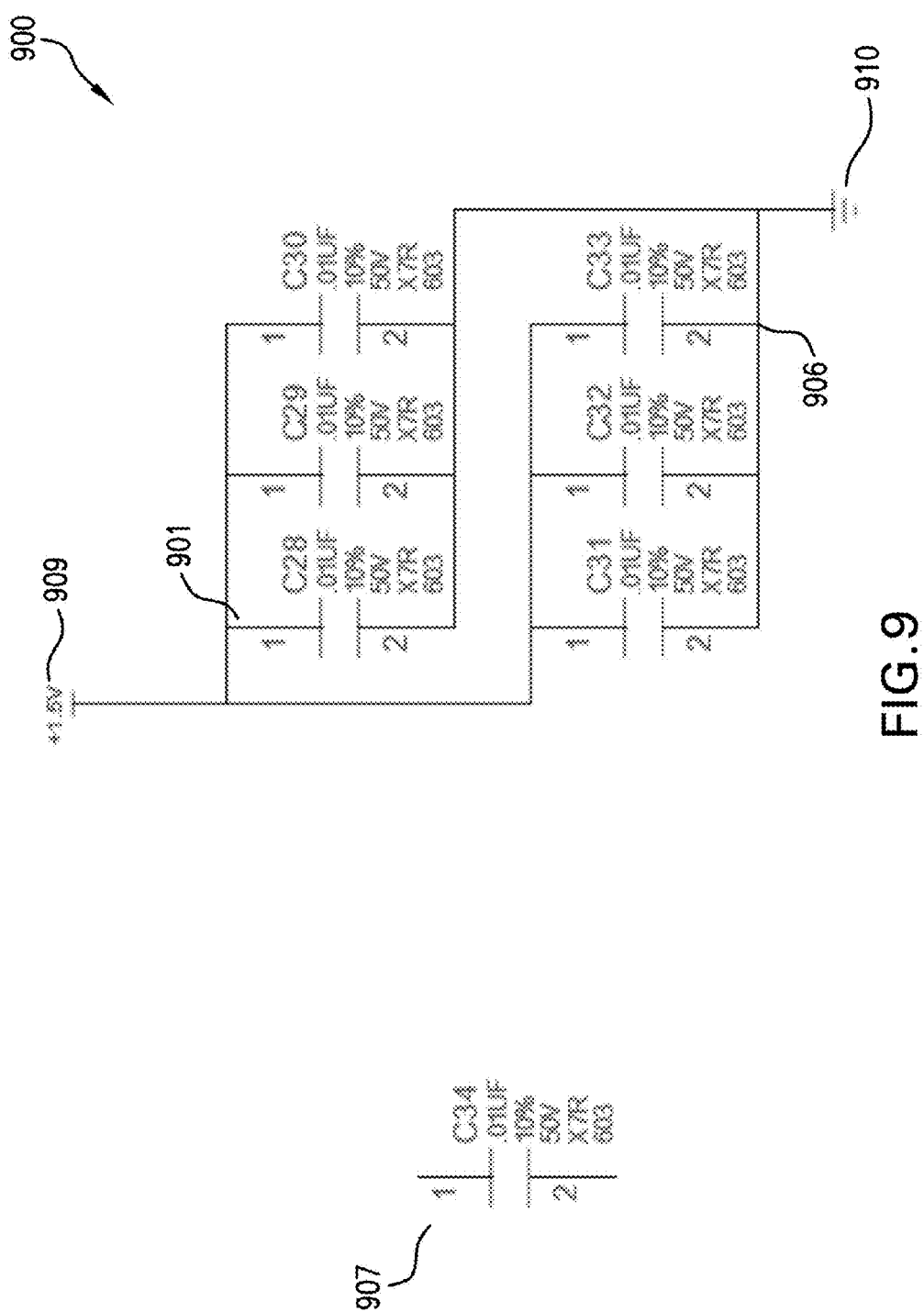
FIG. 9 is an illustrative representation of a circuit object and a layout object including constituent circuit objects as illustratively displayed in a portion of a graphic user interface generated during computer execution in accordance with an exemplary embodiment of the present invention.

Turning now to FIG. 9, an ungrouped circuit object 907 such as capacitor "C34" is seen in isolation in the circuit schematic separate from the layout object 900 bypass rail. The layout object 900 was originally configured according to the layout strategy, including placement and interconnect schemes, and constraints including a dimensional constraint thereof. As a result, the power portion 909 was established in the upper left hand corner, two rows of capacitors having three columns each were determined to fit within the dimensional constraints and accordingly, a two-row bypass rail was established with a first capacitor 901 and a last terminal capacitor 906. Additionally, the ground port 910 was established in the lower right-hand corner according to the placement scheme of the layout strategy.

A user is empowered to add the ungrouped circuit object 907 to the layout object 900 in a number of ways. As an example, the user may actuate the mouse or other user interface to left click and hold the ungrouped circuit object 907 and while continuing to depress the mouse button, drag the circuit object 907 to the layout object 900. When the circuit object 907 overlaps with the layout object 900, the user may then release the user interface signaling their intent to add circuit object 907 to layout object 900. Responsive to that editing action, the layout object acquisition unit reconfigures the member circuit objects 901-910 (inclusive of newly added circuit object 907) according to the layout strategy previously applied thereto. The reconfiguration is executed considering that now a new circuit object 907 is being inserted to bring a total of seven capacitive circuit objects which must now fit within the dimensionality constraints, and other attributes and parameters previously set in accordance with the layout strategy. Additionally, the interconnectivity will need to be reconfigured to provide power and grounding to the additional circuit object in accordance with the interconnection scheme of the layout strategy.

Turning now to FIG. 10, the reconfigured exemplary layout object 1000 is illustrated. The layout object acquisition unit, calculating the dimensionality and other spacing constraints, determined that further expansion in the horizontal plane is less desirable or may not be accommodated. Accordingly, the layout object management unit has created an additional horizontal row 1040 in addition to the pre-existing horizontal rows 920 and 930. The newly inserted member circuit object 907' has been inserted in this new row 1040. Additional routing modifications to bring power and ground to the newly-inserted circuit object 907' have been performed. Routing sections 1011, 1012, and 1013 have been established for such provision of power and ground to the newly-inserted circuit object 907'.

As seen in FIG. 11A, two layout objects 1101 and 1102, in this case represented by Thevenin terminations are illustrated. Each of the Thevenin termination layout objects 1101 and 1102 have respective power inputs 1103 and 1104 and a plurality of ground outputs 1105 and 1106, respectively. Additionally, each layout object 1101 and 1102 has a corresponding width W1 and W2 dimensionality constraint. A user seeking to merge the two layout objects 1101 and 1102 may employ the mouse to lift click, hold, and drag either one of circuit layout object 1101 or 1102 onto the other with at least a portion of overlap and release the mouse button. The user interface of the circuit editing tool or the layout management unit then determines that the two layout objects are to be combined or merged. Alternatively, a user may select each of the two and may actuate a context menu or a tool bar to effect the merge command. The layout object management unit is executed to selectively merge the two layout objects 1101 and 1102. The layout object management unit effects such merging by any suitable measures, such as by the discarding of one layout object, and an increase in the dimensionality constraint of the other layout object such as by summing W1 with W2 for a new circuit object dimensionality constraint and the horizontal dimension of W3 as seen in FIG. 11B.

The member circuit objects of the discarded layout object are then added to the extant layout object as discussed above. The extant layout object is then reconfigured in accordance with the strategy thereof. Thus, in the instant example as seen in FIG. 11B, the group of member circuit objects within the layout object are adaptively reconfigured according to the layout strategy interconnect scheme such that the power portions of each are both coupled to the input power port 1103 such as by re-routing section 1107 to dispose the two Thevenin termination units in parallel disposition. Similarly, as it has been determined that the ground ports 1105 and 1106 are in the lower right-hand corner in both of the Thevenin terminations, they may both be combined with an additional re-routing portion 1108 to dispose the two Thevenin terminations in parallel and provide electrical connectivity with the ground port 1106.

Figure 12A:
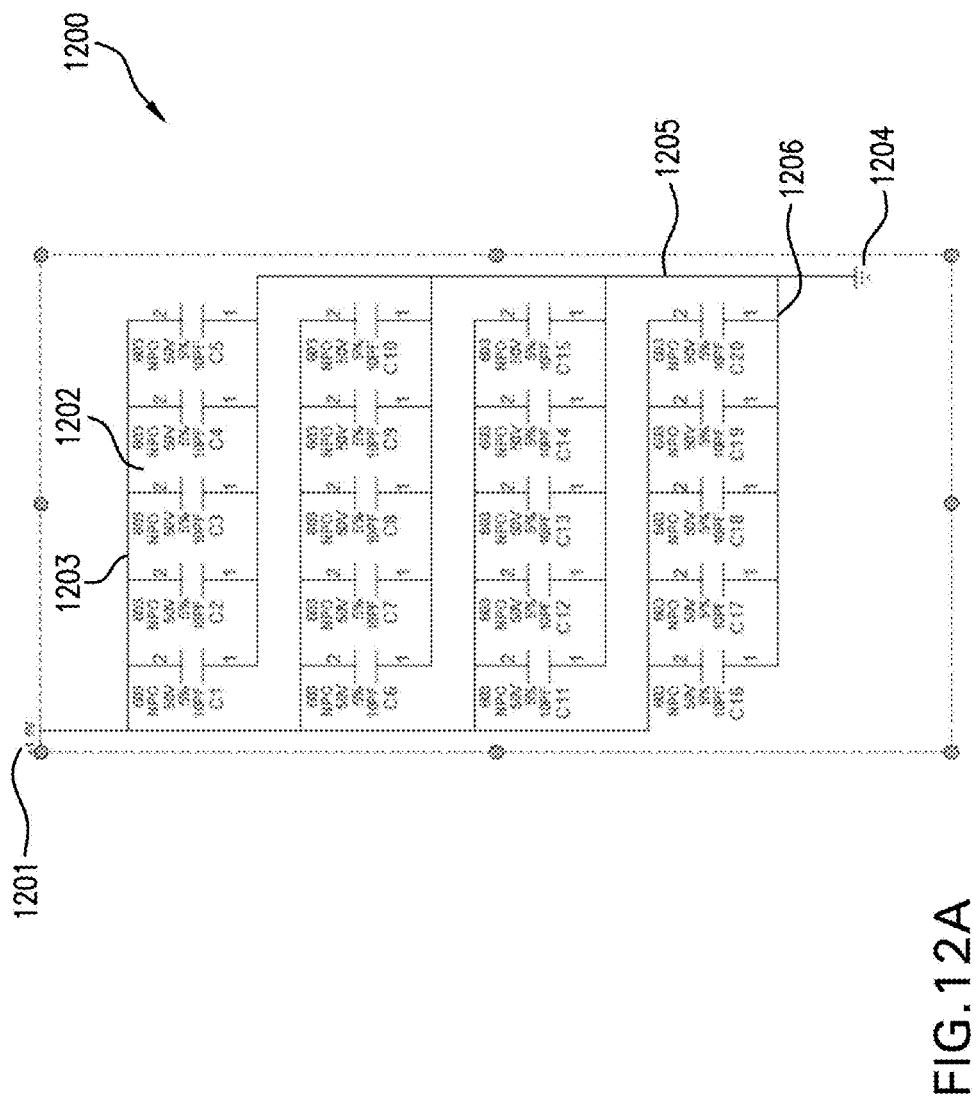
FIG. 12A is an illustrative representation of a layout object illustratively displayed in a portion of a graphic user interface generated during computer execution in accordance with an exemplary embodiment of the present invention.

Turning to FIG. 12A, a layout object 1200 is displayed to a user of a circuit editing tool in a portion of a graphical user interface illustratively shown herein. The layout object 1200 may be moved around the canvas of the circuit schematic such as by left clicking and holding and dragging a pointing device cursor on the display screen to different portions of the canvas. All of the member circuit objects, and their interconnective routing are moved collectively as a unit responsive to the moving instruction. Thus, the power port 1201, the circuit object 1202, the various routing 1203, 1205, and 1206, and ground port 1204 are all moved in unison, maintaining relation one relative to the other.

Figure 12B:
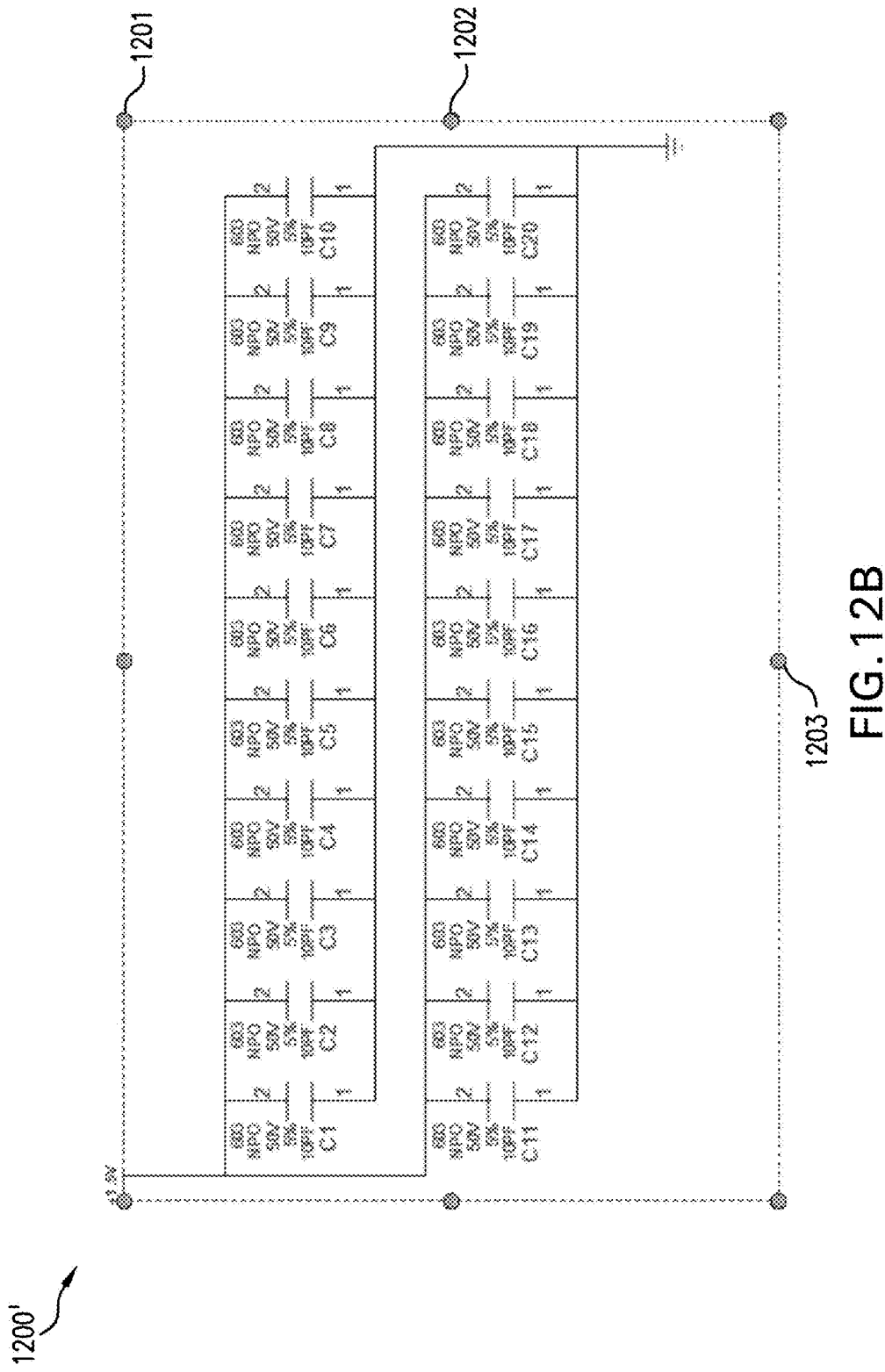
FIG. 12B illustrates an adaptive re-arranged layout object in accordance with an exemplary embodiment of the present invention.

As seen in FIG. 12B, a resizing operation has been performed on layout object 1200'. Such resizing operations may be performed by left clicking and holding on a resize control such as handle 1201, 1202, or 1203. Selecting, holding, and dragging away from the central portion of the layout object 1200' effects a resizing operation in which the layout object management unit re-executes to selectively reconfigure the member circuit objects within the layout object according to the layout strategy and various constraints applied to the layout object. Accordingly, the allowable rows and columns of circuit objects (given their individual dimensionality, constraints of spacing between, margin spacing, and the overall dimensionality constraints set by the resize operation), may all be factored in to a re-calculation to determine a number of rows and columns to best house the member circuit objects of the layout object.

Figure 12C:
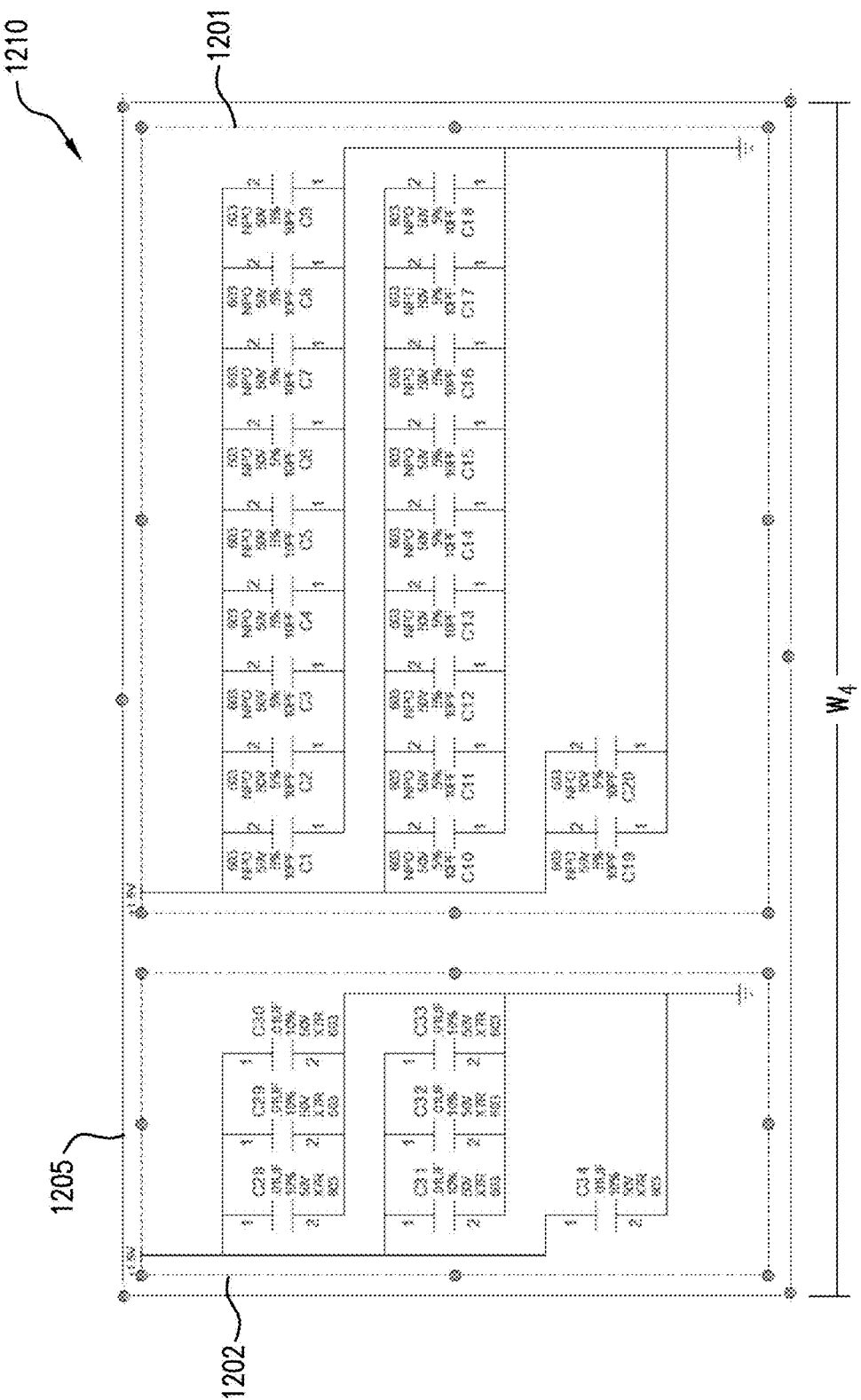
FIG. 12C illustrates two primitive layout objects forming a complex layout object in accordance with an exemplary embodiment of the present invention.

As seen in FIG. 12C, two layout objects 1201 and 1202 have been added into a third, parent layout 1205, to thereby form a hierarchical, or nested layout object 1210 having a width of W4. An exemplary layout strategy defining the layout object as seen in FIG. 12C is included below:

```
<block name="Demo">-
<!--define FIG. 12C which has two bypass rails in horizontal layout-->
-<LayoutObject>
<!--bounding box of the layout object-->
-<property name="geometry">-<rect> <x>0</x> <y>0</y>
<width>0</width>
<height>0</height> </rect> </property>
<!--position of the layout object-->
-<property name="position"> <x>100</x> <y>100</y>
</property>
<!--define that the layout object group has the horizontal layout-->
-<LayoutStrategy class="Horizonal">-<grid> <property name="rows">1</property>     <property name="columns">2</property>-<cell>-<location>
<row>1</row> <column>1</column> </location>
<!--the first object is a Bypass rail of C28 through C34-->
-<LayoutObject>
<!--geometry and position details omited for clarity and brevity-->
<!--now defined the layout strategy of the first ByPass-->
-<LayoutStrategy class="ByPass">-<grid> <property name="rows">5</property>     <property name="columns">5</property>
<!--7 capacitors one power and one ground-->
<property name="element count">9</property>-<cell>-<location>
<row>1</row>    <column>1</column>    </location>
<power!> </cell>-<cell>-<location> <row>5</row> <column>5</column> </location> <ground/> </cell>-<cell>-<location> <row>2</row> <column>2</column> </location>-<capacitor> <property name="ID">C28</property>
</capacitor> </cell>-<cell>-<location> <row>2</row>
<column>3</column> </location>-<capacitor><property name="ID">C29</property> </capacitor> </cell>
<!--and so on for other capacitors-->
</grid> </LayoutStrategy> </LayoutObject> </cell>-
<cell>-<location><row>1</row>    <column>2</column>
</location>
<!--the second object is a Bypass rail of C1 through C20-->
-<LayoutObject>
<!--geometry and position details ommited-->
-<LayoutStrategy class="ByPass">-<grid> <property name="rows">5</property>     <property name="colums">11</property>
<!--20 capacitors one power and one ground-->
<property name="element count">22</property>-<cell>-<location><row>1</row> <column>1</column> </location> <power!> </cell>-<cell>-<location> <row>5</row> <column>11</column> </location> <ground/> </cell>
-<cell>-<location> <row>2</row> <column>2</column>
</location>-<capacitor> <property name="ID">C1</property>
<!--to align the pins of the symbol to the power a rotation of 180 was applied-->
<property name="rotation">180</property> </capacitor>
</cell>-<cell>-<location> <row>2</row><column>3</column> </location>-<capacitor><property name="ID">C2</property>
<!--to align the pins of the symbol to the power a rotation of 180 was applied--><property name="rotation">180</property> </capacitor> </cell><!--and so on for other capacitors-->
</grid>     </LayoutStrategy>     </LayoutObject>     </cell>
</grid>     </LayoutStrategy></LayoutObject>     
</block>.
```

Figure 12D:
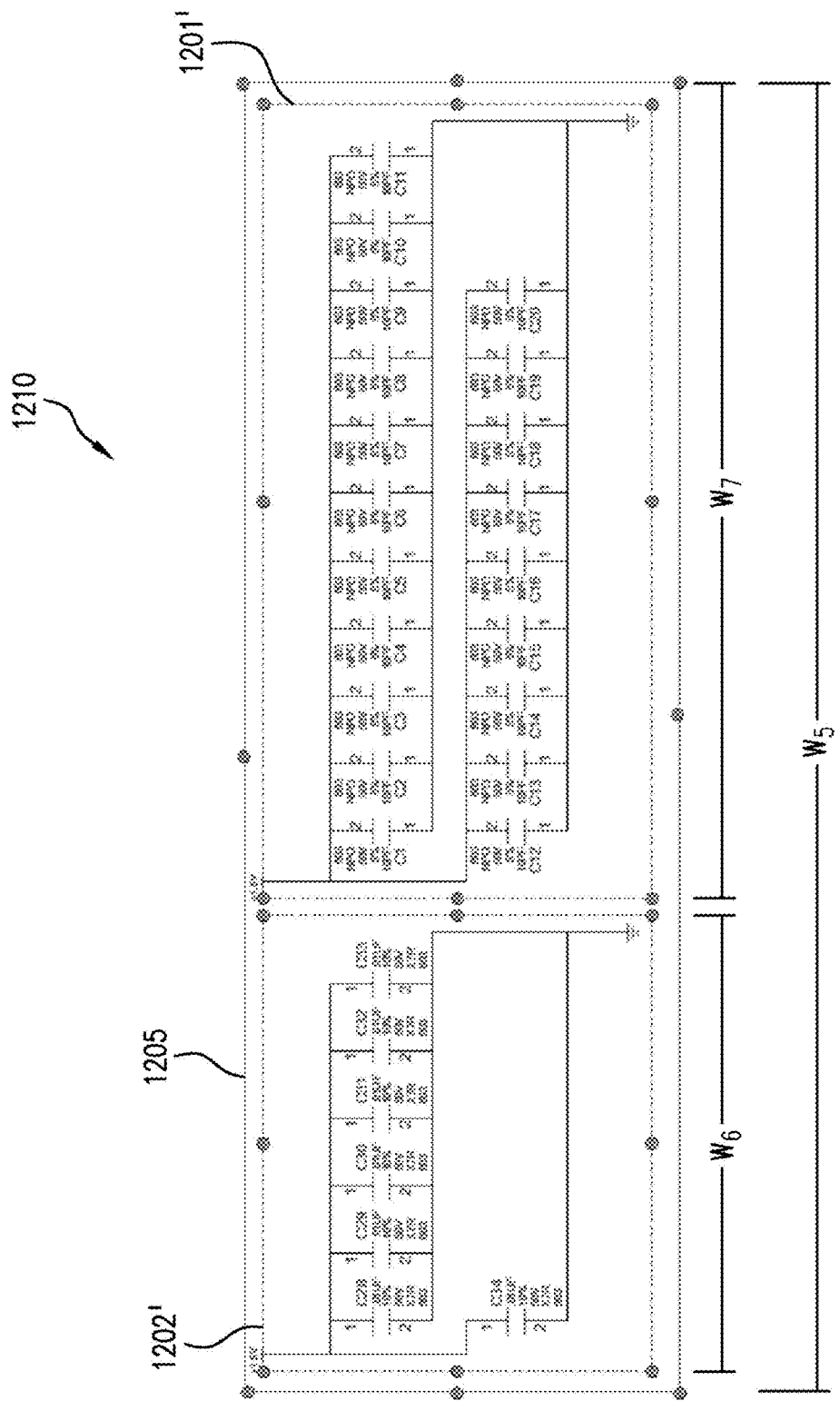
FIG. 12D is another illustrative representation of a portion of a graphic user interface generated during computer execution and illustrating a nested inherited resize operation on two layout objects contained within the resized complex layout object; and, FIG. 13 is a block diagram illustrating an interconnection of system components for implementing an exemplary embodiment of the present invention.

FIG. 12D illustrates a resized hierarchical layout object 1205, and an inherited or nested resizing of primitive layouts 1202' and 1201' subordinate to layout object 1205. The primitive layout objects 1201' and 1202' are themselves reconfigured and resized automatically responsive to the resizing of their superordinate layout object 1205. Each of the layout objects is resized according to their own layout strategy and (to the extent applicable) to their parent layout strategy. Thus, the width W4 as seen in FIG. 12C has increased to a horizontal width W5 as seen in FIG. 12D. Accordingly, the widths W6 and W7 of primitive or subordinate layout objects 1201' and 1202' respectively, have each been adaptively reconfigured according to the increased dimensional constraint set by W5 and the circuit objects have also been reconfigured.

Though not shown, a number of other manipulations of the layout strategy may be effected as well. For example, the attributes, such as the margin and spacing of components in the layout strategy placement scheme, may be modified. Layout specific properties defined in the placement scheme such as the option to dispose the power at the upper left, upper right, or the ground at the lower left or lower right, may be modified as well. The default values for the layout attributes may be saved to a configuration strategy file and such file may be selectively reloaded for application to other layout objects or ungrouped circuit objects to be added to a layout object. Reconfiguration according to the modified constraints is executed responsive to changing constraints and attributes.

Figure 13:
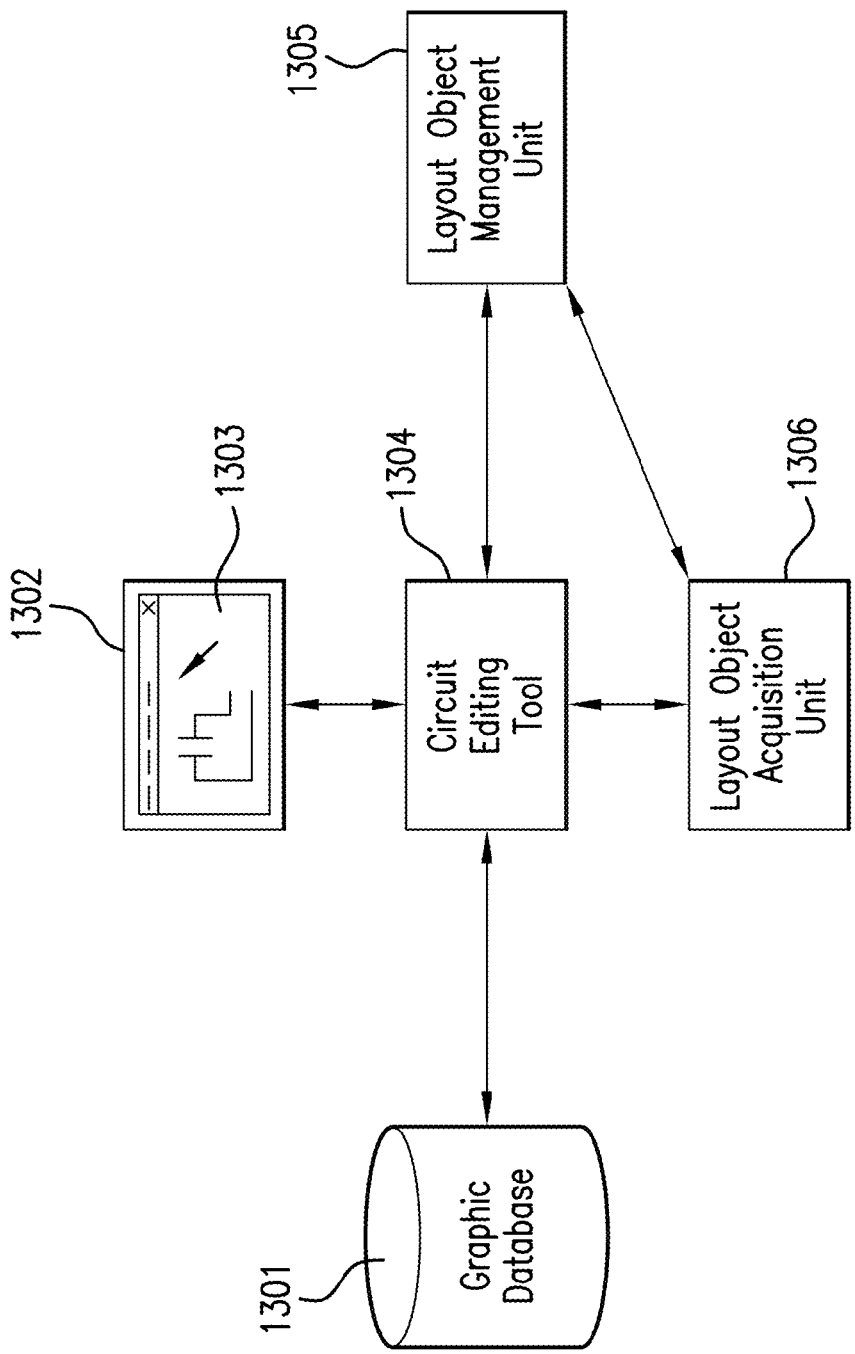

Turning now to FIG. 13, an exemplary system for automatically enforcing schematic layout strategy applied to a group of schematically represented circuit objects of an electronic circuit design is illustrated. A circuit editing tool 1304 is operatively coupled to and accesses graphic database 1301 to retrieve graphic representations and attributes of circuit objects to be displayed on display 1302 through a graphical user interface 1303. A layout object acquisition unit 1306 is coupled to the circuit editing tool 1304 and is executable to selectively apply any one of a number of predetermined layout strategies stored in graphic database 1301 or in other data stores accessible to the layout object acquisition unit 1306. The layout object acquisition unit 1306 selectively applies the layout strategy to at least one group of circuit objects to generate a corresponding layout object according to a layout placement and interconnection routing scheme. A layout object management unit 1305 is coupled to the circuit editing tool 1304 and the layout object acquisition unit 1306. The layout object management unit 1305 adaptively reconfigures the layout object in accordance with the predefined layout strategy thereof responsive to a user-initiated editing operation imposed on at least one of the circuit objects within the layout object.

Although this invention has been described in specific forms and configurations thereof, it will be appreciated that various modifications other than those discussed above may be resorted to without departing from either the spirit or scope of the invention. For example, equivalent elements may be substituted for those specifically shown and described, certain features may be used independently of other features, and in certain cases, particular combinations of circuit designs and implementation flow of processing steps may be reversed, interposed, or mutated, all without departing from the spirit or scope of the invention as defined in the appended Claims.

What is claimed is:

1. A system for automatically enforcing a schematic layout strategy applied to a group of schematically represented circuit objects of an electronic circuit design, comprising:
    a circuit editing tool accessing a graphic database to electronically render schematic representations of the circuit objects responsive to user input, said circuit editing tool having a graphic user interface and a display for graphically displaying the schematic representations on one or more graphic pages;
    a layout object acquisition unit coupled to said circuit editing tool, said layout object acquisition unit being actuated responsive to user input to selectively apply a predetermined layout strategy to at least one group of circuit objects selected from a pre-existing portion of a schematic representation of the electronic circuit design to reconfigure said group of circuit objects into a layout object corresponding to the predetermined layout strategy, said group of circuit objects including circuit objects of differing object types, said predetermined layout strategy including a defining set of expected circuit objects and a defining set of placement and interconnection routing schemes for the schematic representation of the grouped circuit objects one relative to the other, said placement scheme placing at least one circuit object relative to another circuit object of different object type, said predetermined layout strategy predefined and previously stored as one of a plurality of layout strategies representing a plurality of defining sets of expected circuit objects; and,
    a layout object management unit coupled to said layout object acquisition unit and said circuit editing tool, said layout object management unit adaptively reconfiguring said layout object in accordance with the layout strategy thereof responsive to an editing operation being imposed on at least one circuit object within said layout object,
    wherein the electronic circuit design represents an electronic circuit to be produced.

2. The system as recited in claim 1, wherein said placement scheme of said predetermined layout strategy includes relative margin and spacing attributes to be preserved between at least neighboring pairs of said circuit objects when schematically represented within said layout object.

3. The system as recited in claim 2, wherein said interconnect routing scheme of said predetermined layout strategy defines at least one of: a bypass capacitor rail sub-circuit, a Thevenin termination sub-circuit; a pull-up voltage coupling sub-circuit; a pull-down voltage coupling sub-circuit; and, a filter sub-circuit.

4. The system as recited in claim 3, wherein said layout object management unit executes at least one of the following adaptive actions within a schematic representation of the electronic circuit design:
    move said layout object;
    rotate said layout object;
    re-size said layout object;
    re-format the margin or spacing attributes of said layout object;
    merge a plurality of said layout objects;
    re-arrange the circuit objects of said layout object;
    reconstitute the circuit objects of said layout object; and,
    re-connect the reconstituted circuit objects of said layout object.

5. The system as recited in claim 3, wherein said layout object acquisition unit is selectively executable to merge a plurality of said layout objects within a schematic representation of the electronic circuit design.

6. A system for automatically enforcing a schematic layout strategy applied to a group of schematically represented circuit objects of an electronic circuit design, comprising:
    a circuit editing tool accessing a graphic database to electronically render schematic representations of the circuit objects responsive to user input, said circuit editing tool having a graphic user interface and a display for graphically displaying the schematic representations on one or more graphic pages;
    a layout object acquisition unit coupled to said circuit editing tool, said layout object acquisition unit being actuated responsive to user input to selectively apply a predetermined layout strategy to at least one group of circuit objects selected from a pre-existing portion of a schematic representation of the electronic circuit design to generate a layout object corresponding to the predetermined layout strategy, said group of circuit objects including circuit objects of differing object types, said predetermined layout strategy including a defining set of expected circuit objects and a defining set of placement and interconnection routing schemes for the schematic representation of the grouped circuit objects one relative to the other, said placement scheme placing at least one circuit object relative to another circuit object of different object type, said predetermined layout strategy predefined and previously stored as one of a plurality of layout strategies representing a plurality of defining sets of expected circuit objects; and,
    a layout object management unit coupled to said layout object acquisition unit and said circuit editing tool, said layout object management unit being programmably configured to automatically:
        detect an editing operation imposed by said circuit editing tool on at least one circuit object within said layout object; and,
        adaptively adjust said layout object responsive to editing operation detected, in accordance with said layout strategy, wherein the electronic circuit design represents an electronic circuit to be produced.

7. The system as recited in claim 6, wherein said placement scheme of said predetermined layout strategy includes relative margin and spacing attributes to be preserved between at least neighboring pairs of said circuit objects when schematically represented within said layout object.

8. The system as recited in claim 7, wherein said interconnect routing scheme of said predetermined layout strategy defines at least one of: a bypass capacitor rail sub-circuit, a Thevenin termination sub-circuit; a pull-up voltage coupling sub-circuit; a pull-down voltage coupling sub-circuit; and, a filter sub-circuit.

9. The system as recited in claim 7, wherein said layout object management unit executes at least one of the following adaptive actions within a schematic representation of the electronic circuit design:
   move said layout object;
   rotate said layout object;
   re-size said layout object;
   re-format the margin or spacing attributes of said layout object;
   re-arrange the circuit objects of said layout object;
   reconstitute the circuit objects of said layout object; and,
   re-connect the reconstituted circuit objects of said layout object.

10. The system as recited in claim 9, wherein said layout object acquisition unit is selectively executable to merge a plurality of said layout objects within a schematic representation of the electronic circuit design.

11. The system as recited in claim 9, wherein said layout object acquisition unit is executable to associate said layout object with a parent circuit object selected from the schematic representation of the electronic circuit design, and said layout object management unit conditionally maintains said layout object within the electronic circuit design based on said parent circuit object.

12. A method for automatically enforcing a schematic layout strategy applied to a group of schematically represented circuit objects of an electronic circuit design, comprising:
   executing a circuit editing tool to access a graphic database and electronically render schematic representations of the circuit objects responsive to user input;
   graphically displaying the schematic representations on one or more graphic pages within a graphic user interface on a display;
   executing a processor to selectively apply, responsive to user input, a predetermined layout strategy to at least one group of circuit objects selected from a pre-existing portion of a schematic representation of the electronic circuit design to reconfigure said group of circuit objects into a layout object corresponding to the predetermined layout strategy, said group of circuit objects including circuit objects of differing object types, said predetermined layout strategy including a defining set of expected circuit objects and a defining set of placement and interconnection routing schemes for the schematic representation of the grouped circuit objects, one relative to the other, said placement scheme placing at least one circuit object relative to another circuit object of different object type, said predetermined layout strategy predefined and previously stored as one of a plurality of layout strategies representing a plurality of defining sets of expected circuit objects; and,
   executing a processor to adaptively reconfigure said layout object in accordance with the layout strategy thereof automatically responsive to an editing operation being imposed on at least one circuit object within said layout object,
   wherein the electronic circuit design represents an electronic circuit to be produced.

13. The method as recited in claim 12, wherein said placement scheme of said predetermined layout strategy includes relative margin and spacing attributes to be preserved between at least neighboring pairs of said circuit objects when schematically represented within said layout object.

14. The method as recited in claim 13, wherein said interconnect routing scheme of said predetermined layout strategy defines at least one of: a bypass capacitor rail sub-circuit, a Thevenin termination sub-circuit; a pull-up voltage coupling sub-circuit; a pull-down voltage coupling sub-circuit; and, a filter sub-circuit.

15. The method as recited in claim 12, further comprising:
   merging a plurality of said layout objects within a schematic representation of the electronic circuit design.

16. The method as recited in claim 12, further comprising:
   associating said layout object with a parent circuit object selected from the schematic representation of the electronic circuit design; and,
   conditionally maintaining said layout object within the electronic circuit design based on said parent circuit object.

17. The method as recited in claim 12, wherein said graphic database includes netlist data defining the structure and intercoupling of circuit objects in said layout object.

* * * * *